United States Patent
Fuhr et al.

(10) Patent No.: US 8,945,740 B2
(45) Date of Patent: Feb. 3, 2015

(54) VENT FOR ELECTROCHEMICAL CELL

(75) Inventors: Jason D. Fuhr, Sussex, WI (US);
Wataru Tsutsui, West Lafayette, IN (US); Gary P. Houchin-Miller, Milwaukee, WI (US); Christopher M. Bonin, South Milwaukee, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 0 days.

(21) Appl. No.: 13/270,147

(22) Filed: Oct. 10, 2011

(65) Prior Publication Data
US 2012/0077062 A1    Mar. 29, 2012

Related U.S. Application Data

(63) Continuation of application No. PCT/US2010/031065, filed on Apr. 14, 2010.

(60) Provisional application No. 61/169,657, filed on Apr. 15, 2009, provisional application No. 61/172,148, filed on Apr. 23, 2009.

(51) Int. Cl.
*H01M 2/12* (2006.01)
*H01M 2/02* (2006.01)
*H01M 2/34* (2006.01)

(52) U.S. Cl.
CPC .......... *H01M 2/1241* (2013.01); *H01M 2/0202* (2013.01); *H01M 2/024* (2013.01); *H01M 2/345* (2013.01); *H01M 2200/20* (2013.01)
USPC .............................................. 429/56; 429/53

(58) Field of Classification Search
CPC . H01M 2/1241; H01M 2/0202; H01M 2/024; H01M 2200/20; H01M 2/345
USPC .......................................................... 429/56
See application file for complete search history.

(56) References Cited

U.S. PATENT DOCUMENTS

| 4,803,136 A | 2/1989 | Bowsky et al. |
| 4,987,520 A | 1/1991 | Rots |
| 5,853,912 A * | 12/1998 | Naing et al. ................... 429/61 |
| 6,346,342 B1 | 2/2002 | Li |
| 6,562,508 B1 | 5/2003 | Satoh et al. |

(Continued)

FOREIGN PATENT DOCUMENTS

| DE | 3642575 C1 * | 6/1988 | ............... H01G 1/02 |
| EP | 0354607 A1 | 2/1990 | |

(Continued)

OTHER PUBLICATIONS

International Search Report and Written Opinion for International Application No. PCT/US2010/031065, mail date Oct. 26, 2010, 8 pages.

(Continued)

*Primary Examiner* — Gary Harris
(74) *Attorney, Agent, or Firm* — Fletcher Yoder PC

(57) ABSTRACT

An electrochemical cell includes a housing having a first end and a vent located at the first end that is configured to deploy from the housing to allow the expulsion of gases from within the cell. The electrochemical cell also includes at least one projection extending outward from the first end adjacent the vent. The at least one projection is configured to prevent accidental deployment of the vent.

23 Claims, 12 Drawing Sheets

(56) References Cited

U.S. PATENT DOCUMENTS

| | | | |
|---|---|---|---|
| 7,195,839 B2 | 3/2007 | Bouffard et al. | |
| 2006/0210880 A1 | 9/2006 | Howard et al. | |
| 2006/0228620 A1 | 10/2006 | Martinson et al. | |
| 2007/0009785 A1 | 1/2007 | Kozuki et al. | |
| 2008/0070098 A1* | 3/2008 | Ray et al. | 429/53 |
| 2008/0131769 A1 | 6/2008 | Sato et al. | |
| 2008/0171260 A1 | 7/2008 | Kim et al. | |
| 2008/0254343 A1* | 10/2008 | Kaplin et al. | 429/53 |
| 2010/0040945 A1* | 2/2010 | Wang et al. | 429/164 |

FOREIGN PATENT DOCUMENTS

| | | | |
|---|---|---|---|
| EP | 0 785 585 B1 | | 7/1997 |
| EP | 1311019 A2 | | 5/2003 |
| FR | 2908740 A1 | | 5/2008 |
| JP | H04-349347 A | | 12/1992 |
| WO | 2008017120 A1 | | 4/2008 |
| WO | 2008037120 A1 | | 4/2008 |

OTHER PUBLICATIONS

International Search Report and Written Opinion for PCT/US2009/065365, mail date Jun. 24, 2010, 10 pages.
European Patent Office Action for PCT/US2009/065365, mail date Apr. 1, 2011, 3 pages.
Final Office Action for U.S. Appl. No. 13/087,277; dated Mar. 6, 2012; 9 pages.
Non-Final Office Action for U.S. Appl. No. 13/087,277; dated Nov. 14, 2011; 7 pages.
Chinese Office Action for Chinese Application No. 201080024110.1 dated Nov. 25, 2013, 8 pgs.
Extended European Search Report for EP Application 10765106 issued Jul. 24, 2013; 8 pgs.

\* cited by examiner

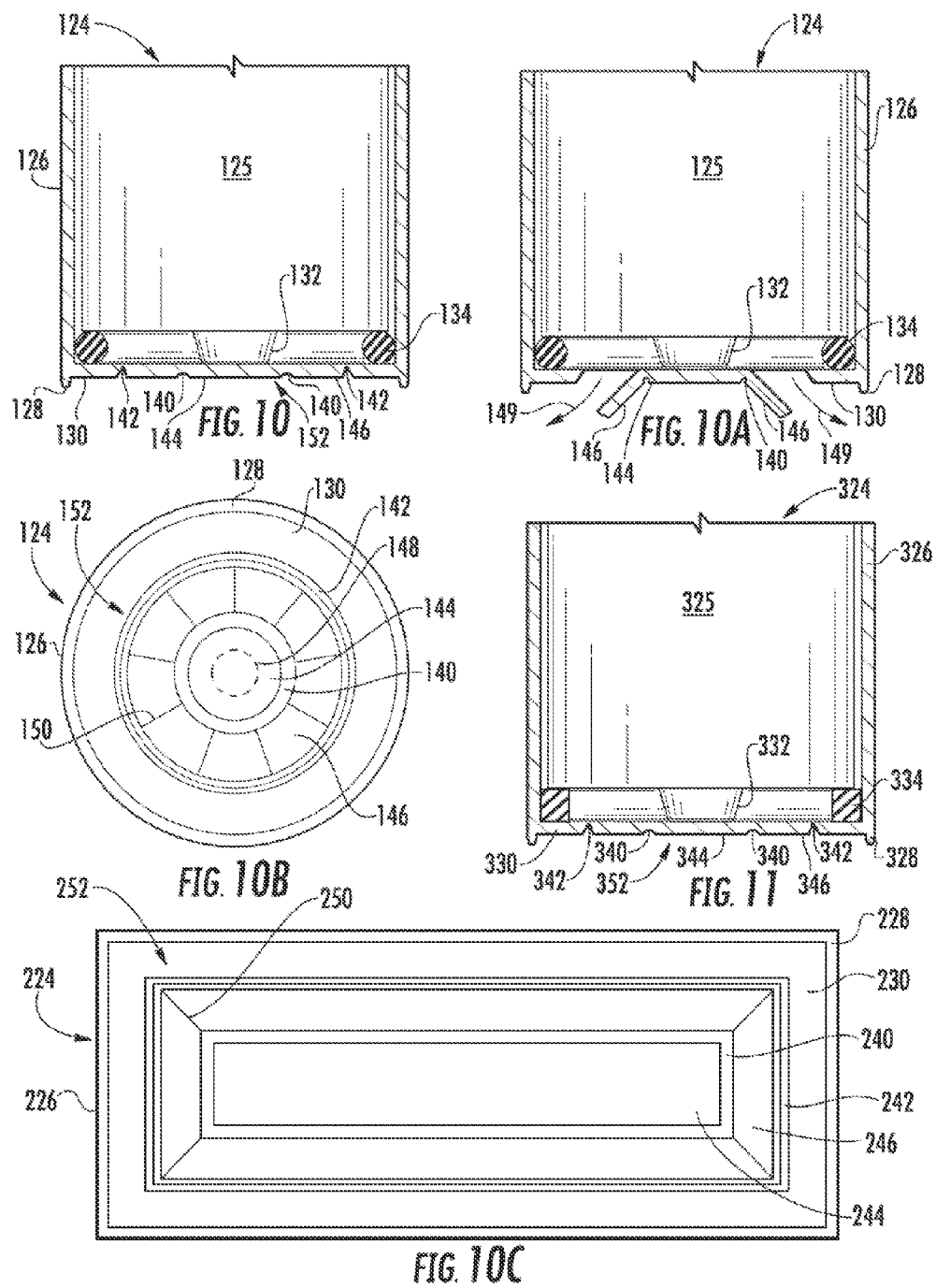

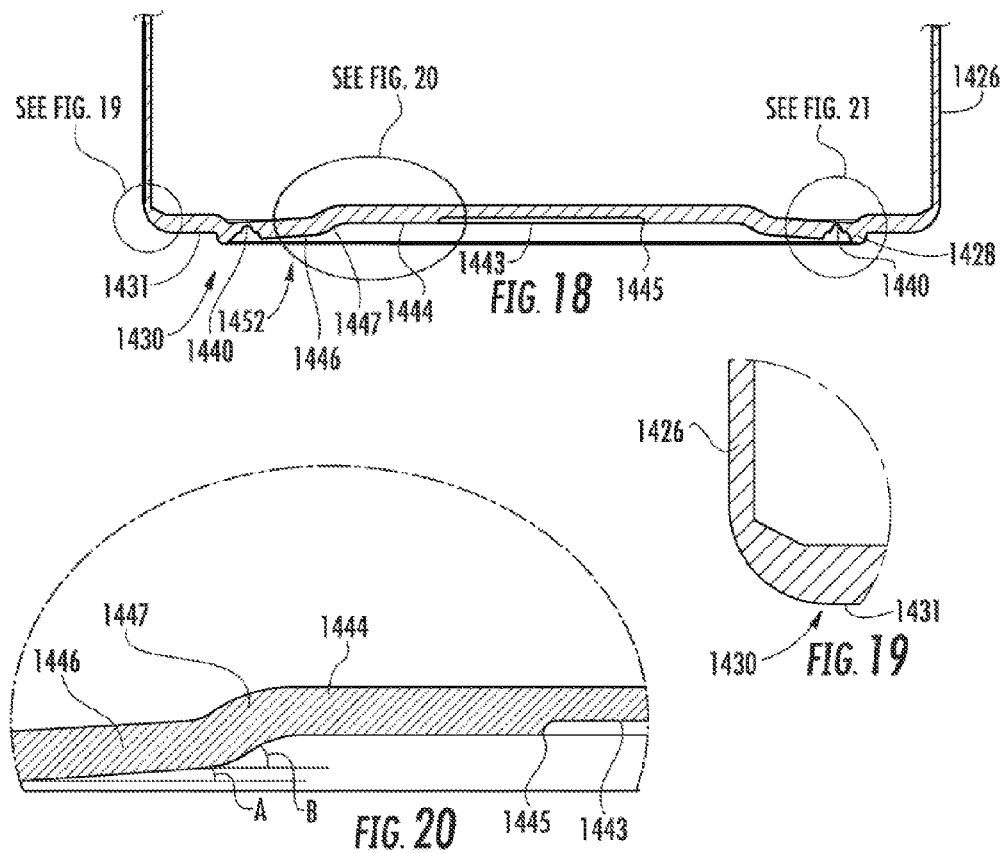
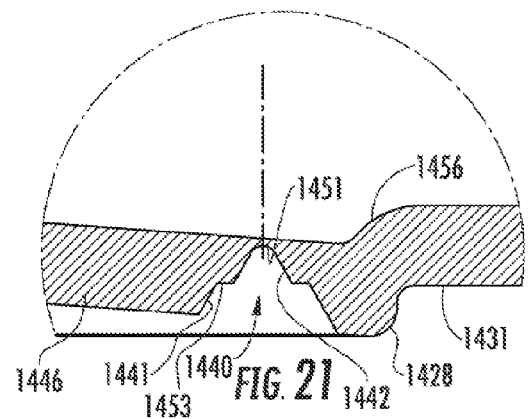

VENT FOR ELECTROCHEMICAL CELL

CROSS-REFERENCE TO RELATED PATENT APPLICATIONS

This application is a continuation of International Patent Application No. PCT/US2010/031065, filed Apr. 14, 2010, which claims the benefit of and priority to U.S. Provisional Patent Application No. 61/169,657, filed Apr. 15, 2009 and U.S. Provisional Patent Application No. 61/172,148, filed Apr. 23, 2009. The entire disclosures of International Patent Application No. PCT/US2010/031065, U.S. Provisional Patent Application No. 61/169,657, and U.S. Provisional Patent Application No. 61/172,148 are incorporated herein by reference.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, an electrochemical cell includes a housing having a first end and a vent located at the first end that is configured to deploy from the housing to allow the expulsion of gases from within the cell. The electrochemical cell also includes at least one projection extending outward from the first end adjacent the vent. The at least one projection is configured to prevent accidental deployment of the vent.

According to an exemplary embodiment, an electrochemical cell includes a housing and a vent located at a first end of the housing. The vent is configured to separate from the first end of the housing to allow gases from within the cell to exit the cell. The cell also includes at least one projection extending outward from the first end of the housing and partially surrounding at least a portion of the vent. The at least one projection is configured to prevent accidental deployment of the vent.

BRIEF DESCRIPTION OF THE DRAWINGS

FIG. 10 is a cross-sectional view of a portion of an electrochemical cell having a vent according to an exemplary embodiment.

FIG. 10A is a detail view of the portion of the electrochemical cell of FIG. 10 showing the vent in a deployed state according to an exemplary embodiment.

FIG. 10B is a bottom view of the electrochemical cell of FIG. 10 according to an exemplary embodiment.

FIG. 10C is a bottom view of an electrochemical cell having features similar to the electrochemical cell of FIGS. 10-10B according to another exemplary embodiment.

FIG. 11 is a cross-sectional view of an electrochemical cell having a vent according to another exemplary embodiment.

FIG. 18 is a detail view of a portion of a housing of the electrochemical cell of FIG. 17 showing a vent according to an exemplary embodiment.

FIG. 19 is a detail view of a portion of the housing of FIG. 18 according to an exemplary embodiment.

FIG. 20 is a detail view of a portion of the vent of FIG. 18 according to an exemplary embodiment.

DETAILED DESCRIPTION

Figure 1:
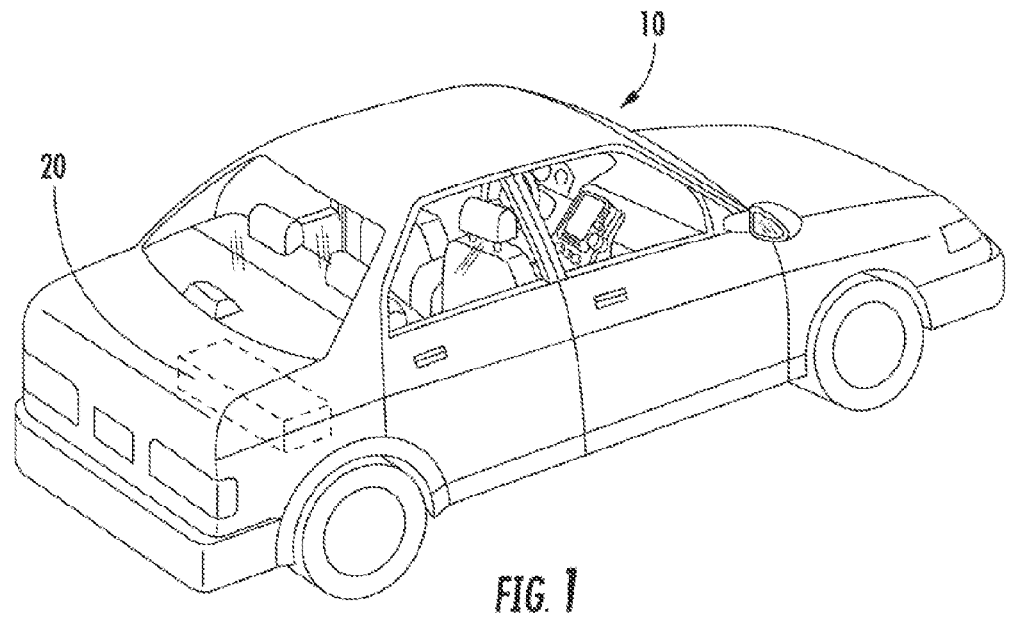
FIG. 1 is a perspective view of a vehicle including a battery system according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, or cooling devices, etc.), and a variety of other considerations.

Figure 2:
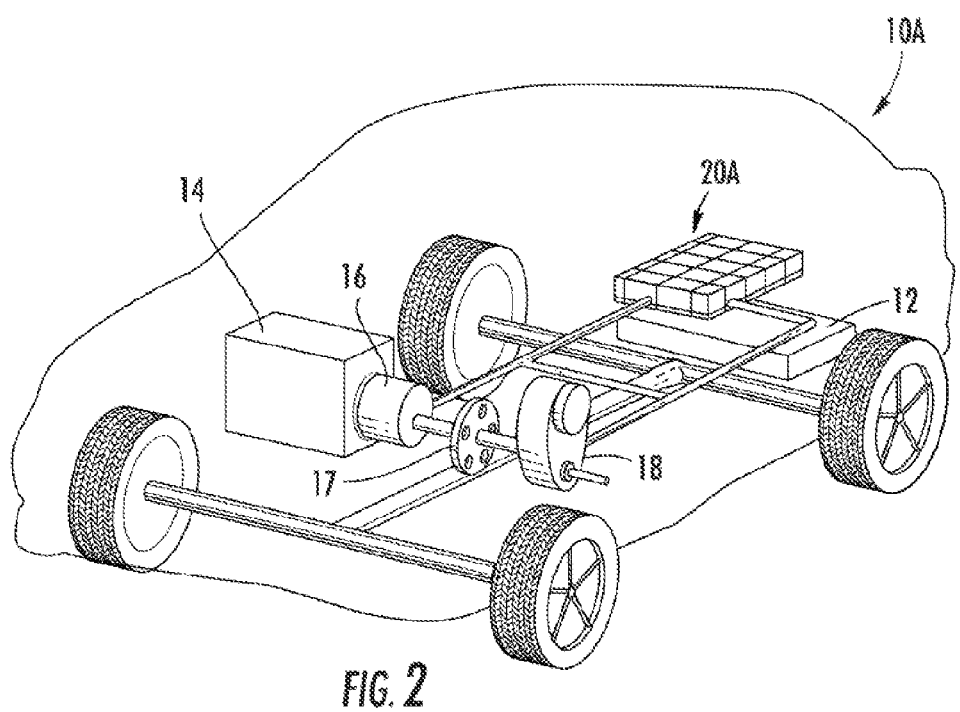
FIG. 2 is a cutaway schematic view of a vehicle including a battery system according to an exemplary embodiment.

FIG. 2 illustrates a cutaway schematic view of a vehicle 10A provided in the form of an HEV according to an exemplary embodiment. A battery system 20A is provided toward the rear of the vehicle 10A proximate a fuel tank 12 (the battery system 20A may be provided immediately adjacent the fuel tank 12 or may be provided in a separate compartment in the rear of the vehicle 10A (e.g., a trunk) or may be provided elsewhere in the vehicle 10A). An internal combustion engine 14 is provided for times when the vehicle 10A utilizes gasoline power to propel the vehicle 10A. An electric motor 16, a power split device 17, and a generator 18 are also provided as part of the vehicle drive system.

Such a vehicle 10A may be powered or driven by just the battery system 20A, by just the engine 14, or by both the battery system 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery systems 20, 20A, the type of vehicles 10, 10A, the type of vehicle technology (e.g., EV, HEV, PHEV, etc.), and the battery chemistry, among other features, may differ from those shown or described.

Figure 3:
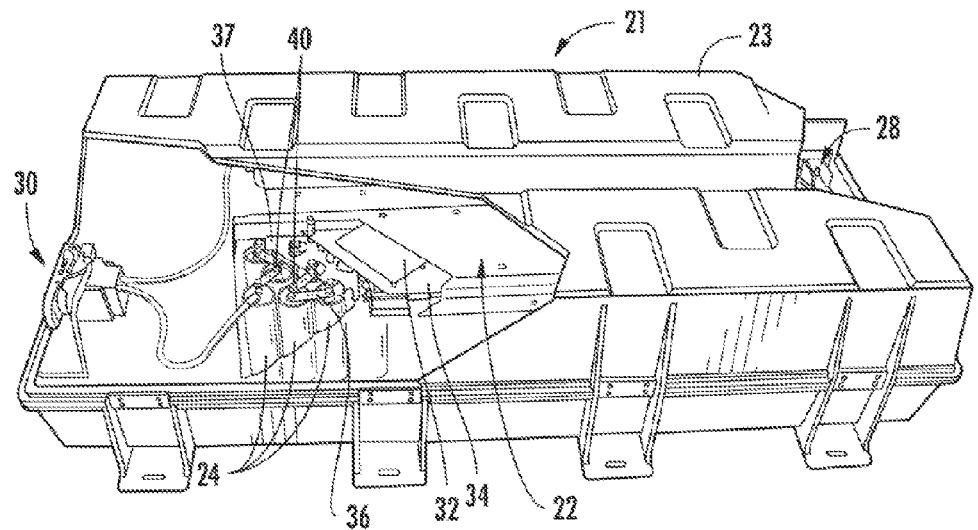
FIGS. 3-4 are partial cutaway views of a battery system according to an exemplary embodiment.
Figure 4:
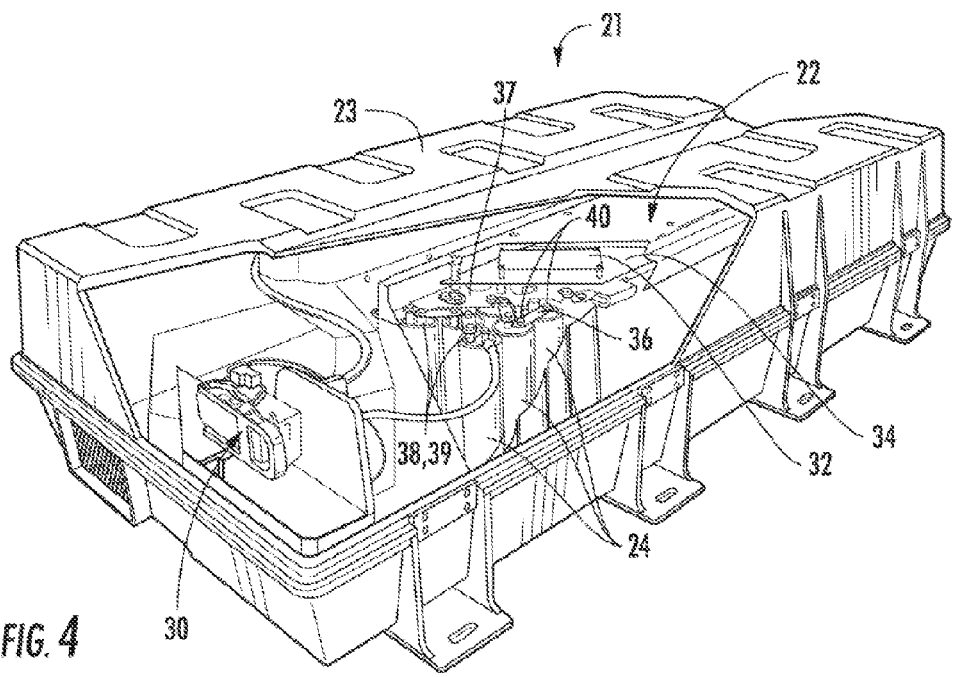
Figure 5:
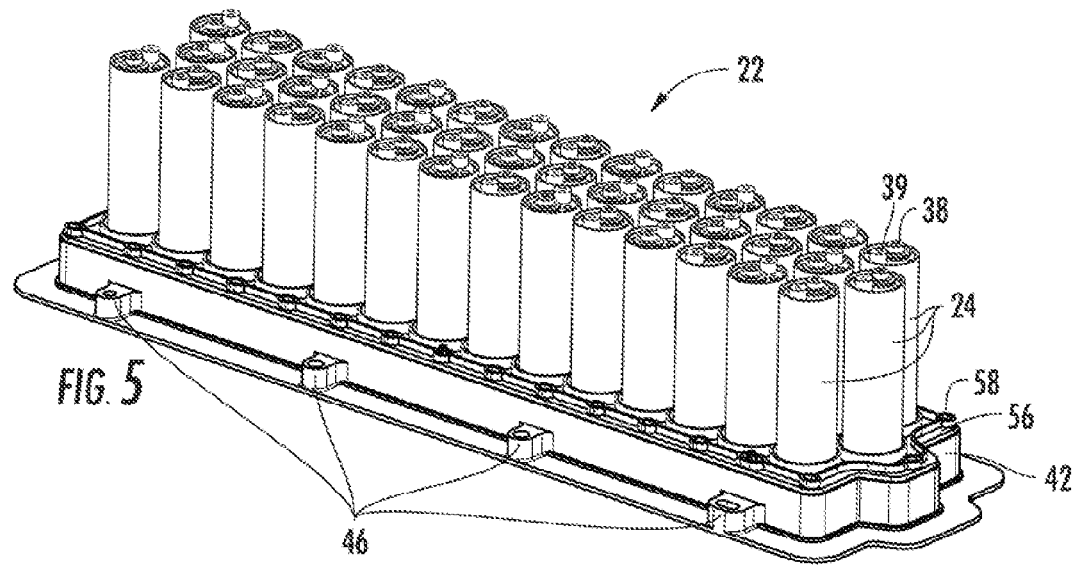
FIGS. 5-6 are isometric views of a portion of a battery module for use in a battery system according to an exemplary embodiment.
Figure 6:
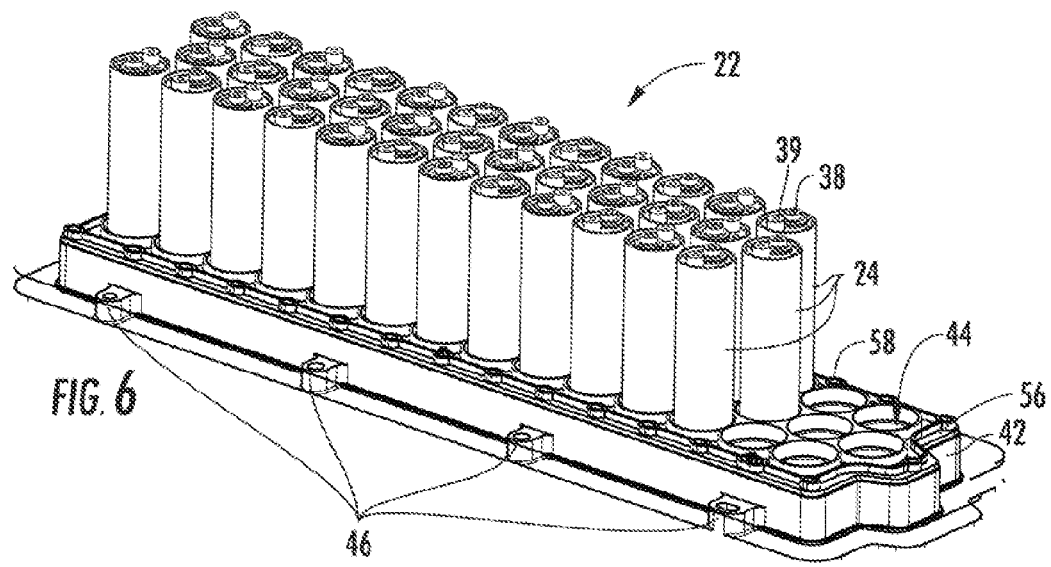

Referring now to FIGS. 3-4, partial cutaway views of a battery system 21 are shown according to an exemplary embodiment. According to an exemplary embodiment, the battery system 21 is responsible for packaging or containing electrochemical batteries or cells 24, connecting the electrochemical cells 24 to each other and/or to other components of the vehicle electrical system, and regulating the electrochemical cells 24 and other features of the battery system 21. For example, the battery system 21 may include features that are responsible for monitoring and controlling the electrical performance of the battery system 21, managing the thermal behavior of the battery system 21, containing and/or routing of effluent (e.g., gases that may be vented from a cell 24), and other aspects of the battery system 21.

According to the exemplary embodiment as shown in FIGS. 3-4, the battery system 21 includes a cover or housing 23 that encloses the components of the battery system 21. Included in the battery system are two battery modules 22 located side-by-side inside the housing 23. According to other exemplary embodiments, a different number of battery modules 22 may be included in the battery system 21, depending on the desired power and other characteristics of the battery system 21. According to other exemplary embodiments, the battery modules 22 may be located in a configuration other than side-by-side (e.g., end-to-end, etc.).

As shown in FIGS. 3-4, the battery system 21 also includes a high voltage connector 28 located at one end of the battery system 21 and a service disconnect 30 located at a second end of the battery system 21 opposite the first end according to an exemplary embodiment. The high voltage connector 28 connects the battery system 21 to a vehicle 10. The service disconnect 30, when actuated by a user, disconnects the two individual battery modules 22 from one another, thus lowering the overall voltage potential of the battery system 21 by half to allow the user to service the battery system 21.

According to an exemplary embodiment, each battery module 22 includes a plurality of cell supervisory controllers (CSCs) 32 to monitor and regulate the electrochemical cells 24 as needed. According to other various exemplary embodiments, the number of CSCs 32 may differ. The CSCs 32 are mounted on a member shown as a trace board 34 (e.g., a printed circuit board). The trace board 34 includes the necessary wiring to connect the CSCs 32 to the individual electrochemical cells 24 and to connect the CSCs 32 to the battery management system (not shown) of the battery system 21. The trace board 34 also includes various connectors to make these connections possible (e.g., temperature connectors, electrical connectors, voltage connectors, etc.).

Still referring to FIGS. 3-4, each of the battery modules 22 includes a plurality of electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the electrochemical cells 24 could have other physical configurations (e.g., oval, prismatic, polygonal, etc.). The capacity, size, design, and other features of the electrochemical cells 24 may also differ from those shown according to other exemplary embodiments.

Each of the electrochemical cells 24 are electrically coupled to one or more other electrochemical cells 24 or other components of the battery system 21 using connectors provided in the form of bus bars 36 or similar elements. According to an exemplary embodiment, the bus bars 36 are housed or contained in bus bar holders 37. According to an exemplary embodiment, the bus bars 36 are constructed from a conductive material such as copper (or copper alloy), aluminum (or aluminum alloy), or other suitable material. According to an exemplary embodiment, the bus bars 36 may be coupled to terminals 38, 39 of the electrochemical cells 24 by welding (e.g., resistance welding) or through the use of fasteners 40 (e.g., a bolt or screw may be received in a hole at an end of the bus bar 36 and screwed into a threaded hole in the terminal 38, 39).

Referring now to FIGS. 5-8, a portion of a battery module 22 for use in a battery system 21 is shown according to an exemplary embodiment. The battery module 22 includes a plurality of electrochemical cells 24 provided in a first member or tray 42 (e.g., structure, housing, etc.). Although illustrated in FIG. 5 as having a particular number of electrochemical cells 24 (i.e., three rows of electrochemical cells arranged such that 14 electrochemical cells are arranged in each row, for a total of 42 electrochemical cells), it should be noted that according to other exemplary embodiments, a different number and/or arrangement of electrochemical cells 24 may be used in the battery module 22 depending on any of a variety of considerations (e.g., the desired power for the battery module 22, the available space within which the battery module 22 must fit, etc.).

According to an exemplary embodiment, the tray 42 receives the individual electrochemical cells 24 in the proper orientation for assembling the battery module 22. According to an exemplary embodiment, the tray 42 may also include features to provide spacing of the cells away from the bottom of the tray and/or from adjacent cells. For example, according to an exemplary embodiment, the trays may include a series of features shown as sockets 44 (e.g., openings, apertures, etc.) to locate and hold the electrochemical cells 24 in position above the bottom of the tray 42.

As shown in FIGS. 5-8, according to another exemplary embodiment, the tray 42 may also include features shown as bosses 46 that are intended to aid in the retention of a housing or cover (not shown) to enclose and/or retain the plurality of cells 24. According to another exemplary embodiment, the bosses 46 may also aid in securing the tray 42 to the vehicle. According to an exemplary embodiment, the tray 42 may be made of a polymeric material or other suitable material (e.g., electrically insulated material).

Figure 9:
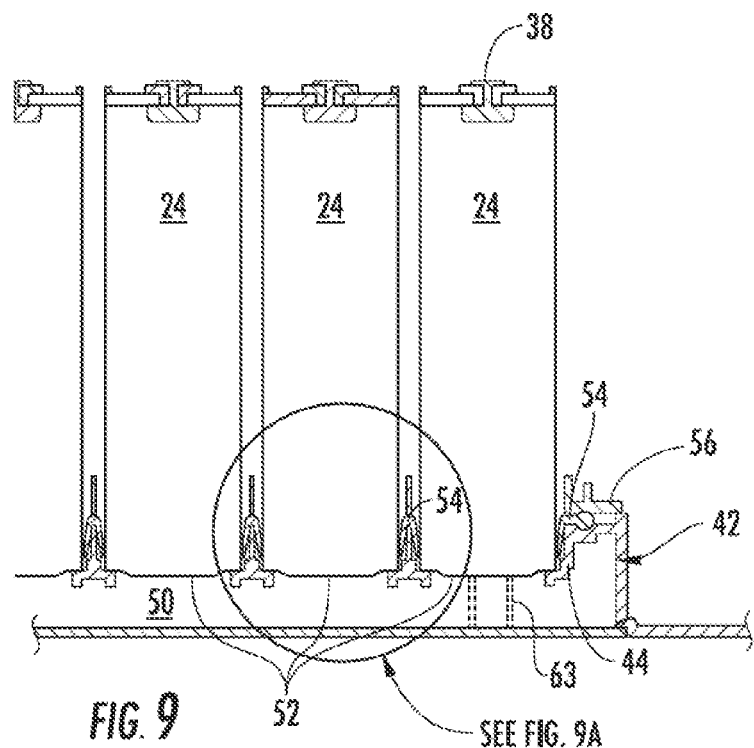
FIG. 9 is a cross-sectional view of a portion of the battery module of FIG. 8 taken along line 9-9 of FIG. 8.
Figure 9A:
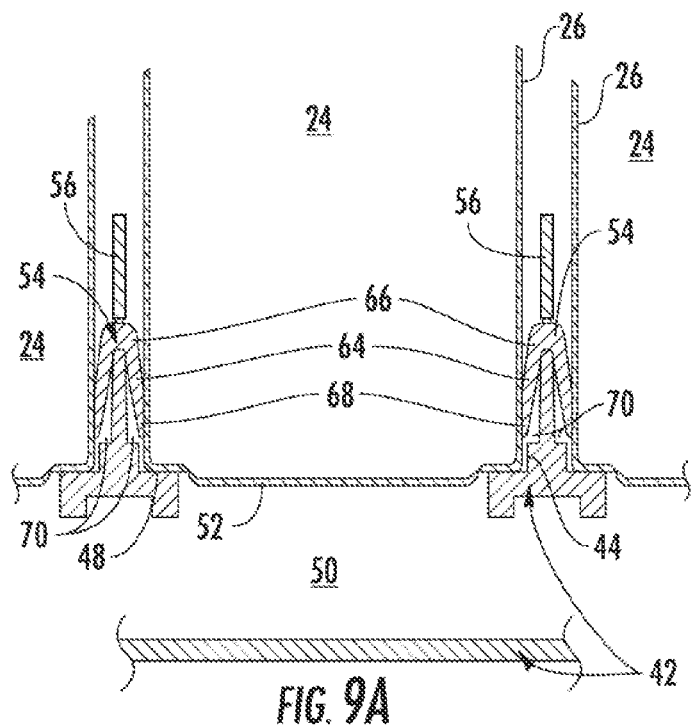
FIG. 9A is a detail view of a portion of the battery module of FIG. 9.

According to an exemplary embodiment, the sockets 44 of the tray 42 are configured to receive (e.g., retain, hold, position, etc.) a lower end or portion of the individual electrochemical cells 24. According to an exemplary embodiment, the sockets 44 are generally circular openings having at least one step or surface 48 (e.g., as shown in FIG. 9A) configured to receive the lower portion of the electrochemical cell 24. According to other exemplary embodiments, the openings of the sockets 44 may have other shapes to receive cells of different shapes (e.g., prismatic, oval, etc.). The lower steps or surface 48 of the socket 44 positions the electrochemical cell 24 at a top portion of an airspace or chamber 50 defined by the tray 42 (e.g., as shown in FIG. 9). The chamber 50 is configured to receive gases and/or effluent that may be vented by the electrochemical cells 24 through a vent feature or vent device (e.g., vent 52 as shown in FIG. 9) of the electrochemical cell 24.

Figure 7:
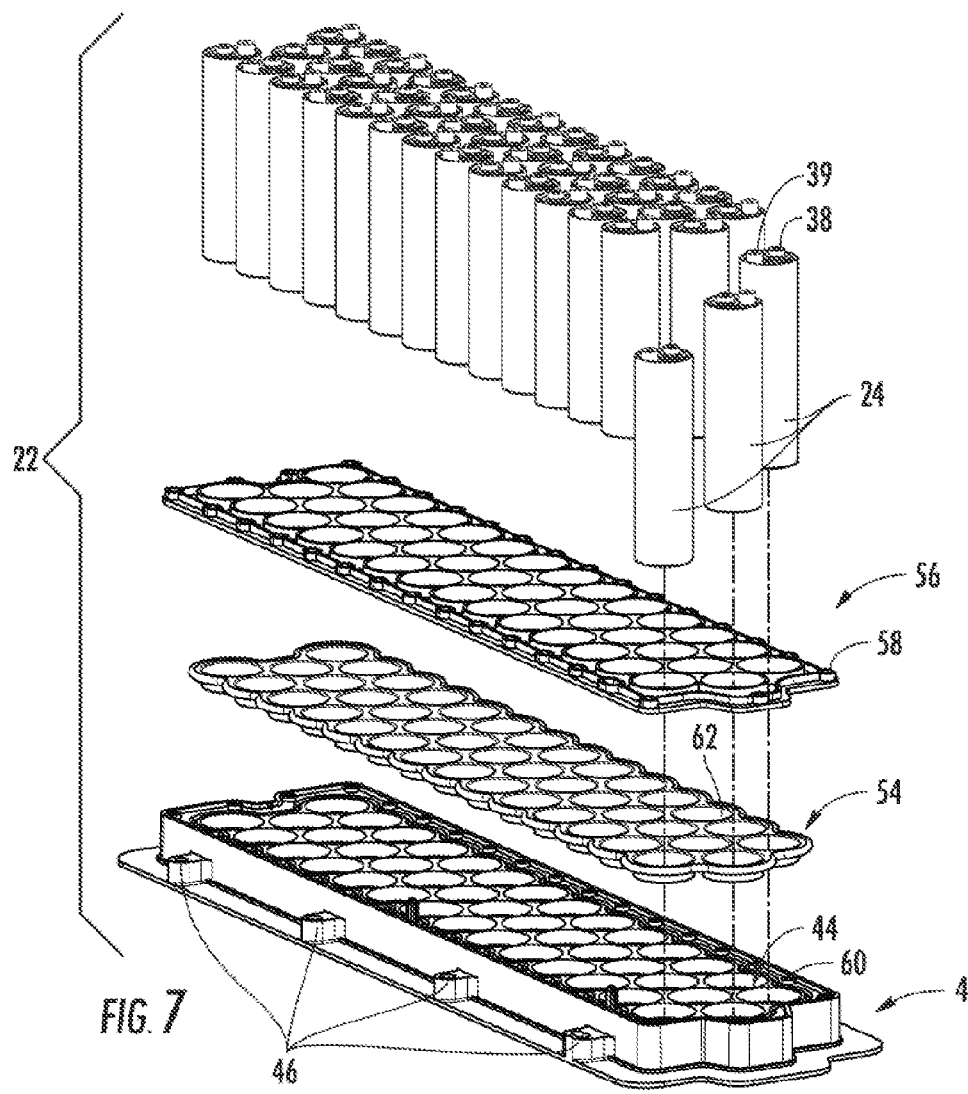
FIG. 7 is a partial exploded view of the battery module of FIG. 5.
Figure 8:
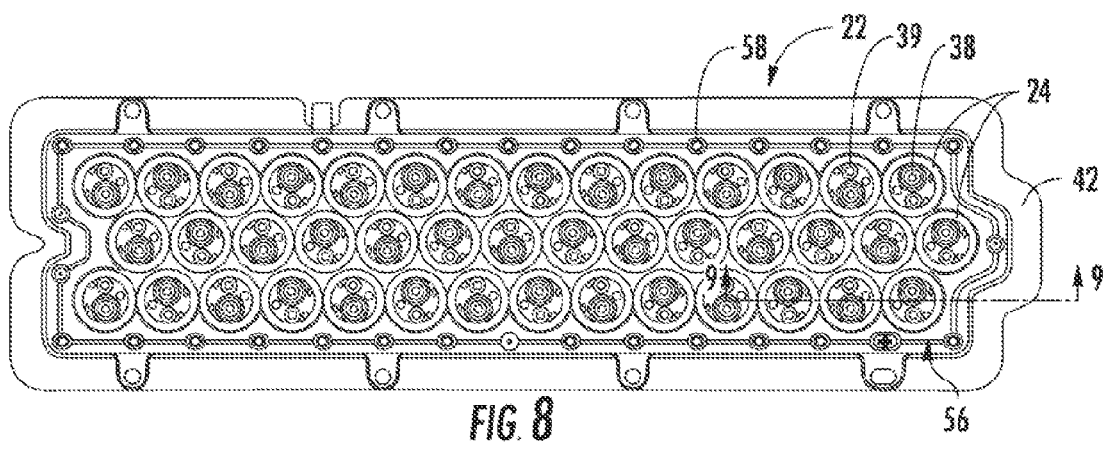
FIG. 8 is a top view of the battery module of FIG. 5.

Referring now to FIGS. 7, 9, and 9A, the battery module 22 may also include a member shown as a gasket or seal 54. According to an exemplary embodiment, the seal 54 is configured to aid in sealing the lower portions of the electrochemical cells 24 in the tray 42 to help retain any gases vented from the electrochemical cells 24 into the chamber 50. According to an exemplary embodiment, the seal 54 is provided adjacent a top surface of the tray 42. According to an exemplary embodiment, the seal 54 may be constructed from a pliable, non-conductive material such as silicone. According to another exemplary embodiment, the seal 54 may be die cut from a silicone sheet or may be a molded silicone member (e.g., made by an injection molding process). According to another exemplary embodiment, the seal may be any seal that is shown and described in International Patent Application No. PCT/US2009/053697, filed Aug. 13, 2009, the entire disclosure of which is incorporated herein by reference. According to other exemplary embodiments, the seal may be any seal that is now known or developed in the future.

According to an exemplary embodiment, a member (fixture, device, plate, retainer, etc.) shown as a clamping plate 56 may be provided above the seal 54 in order to keep the seal 54 in place in relation to the tray 42. The clamping plate 56 may be coupled to the tray 42, for example, by threaded fasteners (not shown) that extend through holes 58 in the clamping plate 56 and are received by threaded holes 60 in the tray 42. According to another exemplary embodiment, the clamping plate 56 may be coupled to the tray 42 via a snap fit.

According to an exemplary embodiment, the seal 54 includes a plurality of openings 62 that align with the plurality of sockets 44 of the tray 42. As shown in FIG. 9A, each of the openings 62 of the seal 54 comprise a lip portion or edge portion 64 (e.g., a deformable extension) provided in contact with an electrochemical cell 24. According to an exemplary embodiment, the edge portion 64 of the seal 54 is angled in toward the electrochemical cell 24 to provide an interference fit with the electrochemical cell 24 in order to aid in sealing the chamber 50.

According to an exemplary embodiment, the edge portion 64 of the seal 54 is thinner than the rest of the seal 54, giving the edge portion flexibility to conform to the outer diameter of the electrochemical cell 24 in order to aid in sealing in the electrochemical cell 24. According to another exemplary embodiment, the edge portion 64 of the seal 54 is tapered (e.g., as shown in FIG. 9A) from the main portion 66 of the seal 54 down to the tip 68 of the edge portion 64. This taper aids in giving the edge portion 64 the flexibility to conform to the outer diameter of the electrochemical cell 24 but still maintain the strength to allow the edge portion 64 to keep its shape over time (e.g., to minimize creep and relaxation of the seal 54 to maintain the interference fit with the electrochemical cell 24).

According to an exemplary embodiment, a space 70 is provided between the edge portion 64 of the seal 54 and each socket 44 of the tray 42 (e.g., as shown in FIG. 9A). The space 70 is connected (e.g., in fluid communication) with the chamber 50 such that when gases are vented into the chamber 50 the gases may enter the space 70 (e.g., by slipping past the bottom of the electrochemical cell 24 and the socket 44). According to an exemplary embodiment, the vented gases press the seal 54 tighter against the electrochemical cell 24 to increase the sealing characteristics of the seal 54.

Referring now to FIGS. 10-10B, a portion of a cell 124 is shown according to another exemplary embodiment. The cell 124 includes a can or housing 126 having a generally cylindrical main body (i.e., walls) and a bottom 130 at one end thereof (although this end is referred to with respect to this and other embodiments herein as "bottom," it should be understood that this could also be a "top" or "side" according to other configurations and/or depending on how the cell is oriented in a given application). The housing 126 also includes a top portion or cover (not shown) at an end of the housing 126 opposite the bottom 130. The housing 126 is configured to receive a cell element 125 (e.g., a wound, cylindrical cell element).

Figure 12A:
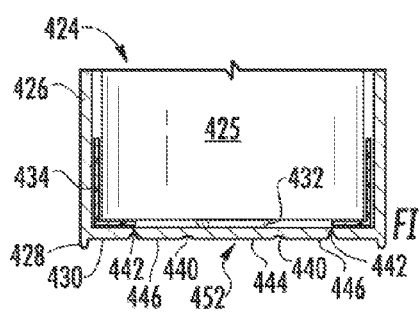
FIGS. 12A-12J are cross-sectional views of an electrochemical cell having a vent according to various other exemplary embodiments.

According to an exemplary embodiment, a member such as an insulator (e.g., shown as an O-ring insulator 134 in FIG. 10, a square-ring insulator 334 in FIG. 11, or a thin insulator 434 (e.g., an L-shaped insulator in cross-section) in FIG. 12A) may be provided between the cell element 125 and the bottom 130 of the housing 126. According to an exemplary embodiment, the insulator may be made from polypropylene. According to other exemplary embodiments, the insulator may be made from any suitable material including other suitable polymeric materials. According to another exemplary embodiment, the cell 124 may also include a thin insulator wrap (not shown) provided around the exterior of the cell element 125 in between the cell element 125 and the housing 126. According to an exemplary embodiment, the insulator and/or the insulator wrap conductively insulate the cell element 125 from the housing 126.

According to an exemplary embodiment, a current collector (such as, e.g., positive current collector 132 shown in FIG. 10, although a negative current collector could be used according to other exemplary embodiments) is provided between an end of the cell element 125 and the bottom 130 of the housing 126. According to an exemplary embodiment, a first side of the current collector 132 is coupled (e.g., welded) to the end of the cell element 125 and a second side of the current collector 132 is coupled (e.g., welded) to the bottom 130 of the housing 126. For example, the current collector 132 may be laser welded to the bottom 130 of the housing in a circular pattern (e.g., such as shown by weld 148 in FIG. 10B). However, according to other exemplary embodiments, the current collector 132 may be coupled to the bottom 130 in a different manner. The current collector 132 provides a conductivity path for current flow from the cell element 125 to the housing 126. According to another exemplary embodiment, the housing 126 may be conductively coupled to a cell terminal (not shown).

According to an exemplary embodiment, the cell 124 includes a vent (such as, e.g., vent 152 shown in FIG. 10). The vent 152 is configured to allow gases and/or effluent to exit the cell 124 once the pressure inside the cell reaches a predetermined amount (e.g., during a rise in cell temperature). When the vent 152 deploys (e.g., activates, opens, separates, etc.), the gases and/or effluent (represented by arrows 149 in FIG. 10A) inside the cell 124 exit the cell 124 to lower the pressure inside the cell 124. According to an exemplary embodiment, the vent 152 acts as a safety device for the cell 124 during a high pressure occurrence.

According to an exemplary embodiment, the vent 152 is located in the bottom 130 of the housing 126. According to other exemplary embodiments, the vent 152 may be located elsewhere (e.g., side of the housing, cover, etc.). According to another exemplary embodiment, the vent 152 may be located in a cover or bottom that is a separate component that is then coupled (e.g., welded) to the housing 126.

According to an exemplary embodiment, the bottom 130 of the housing 126 may include at least one ridge, projection, or ring of material (such as, e.g., projection 128 shown in FIG. 10) extending outward from the bottom of the cell. The projection 128 is configured to prevent premature deployment of the vent 152 during handling and/or assembly of the cell 124. The projection 128 provides for a clearance space between the vent 152 and a surface that the cell 124 is set upon. According to an exemplary embodiment, the clearance space is configured to prevent the vent 152 from being accidentally bumped (and deployed) during handling and/or assembly of the cell 124.

As shown in FIGS. 10-10B, according to one exemplary embodiment, the projection 128 is shown as a continuous ring (e.g., a raised circular ring). However, according to other exemplary embodiment, the projection 128 may not be continuous (i.e., the projection 128 may be discontinuous). For example, the projection 128 may include multiple projections, such as, for example, multiple curved or arcuate projections. The multiple curved projections (or other type of projections) may or may not be equally spaced along the bottom 130, according to various exemplary embodiments. According to other exemplary embodiments, the projections may be not be curved.

As shown in FIGS. 10-10B, the vent 152 includes at least one annular or circular groove 140 (ring, trough, pressure point, fracture point, fracture ring, etc.). According to one exemplary embodiment, the vent 152 also includes a second annular or circular groove 142. As shown in FIG. 10, the outer groove 142 has an upside down V-shaped configuration. According to one exemplary embodiment, the vent 152 is configured to break away (i.e., separate) from the bottom 130 of the housing 126 at the outer groove 142 when the vent 152 deploys. According to other exemplary embodiments, the bottom of the outer groove 142 may have another shape and/or configuration (e.g., rounded shape, curved shape, upside down U-shape, etc.). Also as shown in FIG. 10, the inner groove 140 has a rounded or curved configuration. According to one exemplary embodiment, the vent 152 is configured to bend at the inner groove 140 when the vent 152 deploys. According to other exemplary embodiments, the bottom of the inner groove 140 may have another shape and/or configuration (e.g., upside down V-shape, upside down U-shape, etc.).

As stated earlier, the vent 152 is configured to deploy once the pressure inside the cell 124 reaches a pre-determined amount. When the vent 152 deploys, the outer groove 142 fractures and a flexible portion 146 of the vent 152 separates from the bottom 130 of the housing 126 (e.g., as shown in FIG. 10A). The inner groove 140 aids the outer groove 142 in fracturing by allowing the flexible portion 146 to bend or fold away from the bottom 130 at a center portion 144 of the bottom 130. According to one exemplary embodiment, the center portion 144 remains in contact with the flexible portion 146. According to another exemplary embodiment, the center portion 144 also separates from the flexible portion 146. According to another exemplary embodiment, the vent 152 may be configured to fracture at the inner groove 140, allowing the flexible portion 146 to separate from the center portion 144. In this embodiment, the outer groove 142 is configured to allow the flexible portion 146 to bend or fold away from the bottom 130 during deployment of the vent 152.

By having the vent 152 separate from the bottom 130 of the housing 126, the vent 152 acts as a current interrupt or current disconnect device. This is because the separation of the vent 152 from the bottom 130 of the housing 126 disrupts the flow of current from the cell element 125 (through the current collector 132) to the housing 126. In this way, the vent 152 acts not only as an over-pressure safety device, but also as a current disconnect device.

According to an exemplary embodiment, radial scoring 150 may be provided in between the outer groove 142 and inner groove 140 of the vent 152 (e.g., as shown in FIG. 10B) to help the vent 152 flex or bend (e.g., collapse upon itself) when the vent 152 deploys. According to one exemplary embodiment, the radial scoring 150 is provided as a rounded or curved groove or indentation, although other shapes (e.g., a V-shaped groove) may also be used. According to another exemplary embodiment, a support or post (such as, e.g., post 63 shown in FIG. 9) may be provided below the vent 152 to aid the vent 152 to deploy (e.g., around the support or post). For example, according to one exemplary embodiment, the post 63 may be provided below the center portion 144 to add support to or increase the rigidity of the vent 152 when the flexible portion 146 separates from the bottom 130 (either at the inner groove 140 or the outer groove 142).

According to one exemplary embodiment, the cell element 125 does not move during deployment of the vent 152 (i.e., the cell element remains stationary). According to other exemplary embodiments, the cell element 125 may move within the housing 126 to help deploy the vent 152 (e.g., by "pushing" or "punching" the current collector through the vent). According to one exemplary embodiment, the cell element 125 moves (e.g., toward the vent 152) within the housing 126 due to an increase in pressure within the housing 126.

Referring now to FIG. 10C, a bottom of an electrochemical cell is shown according to another exemplary embodiment. According to an exemplary embodiment, the cell 224 includes features similar to that shown in FIGS. 10-10B, but for a prismatic shaped cell (with similar features as shown in FIGS. 10A-10B labeled with corresponding reference numbers in the 200 series). The features of cell 224 may function similarly to those shown and described above in regard to FIGS. 10-10B, but are sized and/or shaped according to a prismatic configuration.

Referring now to FIG. 11, an electrochemical cell 324 is shown according to another exemplary embodiment. According to an exemplary embodiment, the electrochemical cell 324 includes features similar to those shown in FIGS. 10-10B (with the features labeled with corresponding reference numbers in the 300 series), but with a square-ring insulator 334 (i.e., an annular insulator having a square cross-section). The square-ring insulator 334 performs functionally similar to the O-ring insulator 134 shown in FIGS. 10-10B. According to still other exemplary embodiments, insulators having other cross-sectional shapes and/or sizes are possible (e.g., oval, rectangular, etc.).

Referring now to FIG. 12A, an electrochemical cell 424 is shown according to another exemplary embodiment. According to an exemplary embodiment, the electrochemical cell 424 includes a vent 452 similar to the vent shown in FIGS. 10-10B (with similar features to those in FIGS. 10-11 labeled with corresponding reference numbers in the 400 series).

According to an exemplary embodiment, the electrochemical cell 424 also includes a cell element 425 located in a housing 426. As shown, the electrochemical cell 424 also includes a thin or low-profile insulator 434 provided between the cell element 425 and the cell housing 426 to electrically insulate the cell element 425 from the cell housing 426. According to an exemplary embodiment, the thin insulator 434 has an L-shaped cross-section and extends in a first direction along a side of the cell element 425 and in a second direction along a bottom of the cell element 425.

According to other exemplary embodiments, the thin insulator 434 may have a different cross-section and/or other configuration (e.g., the insulator may be two separate components, the insulator may extend only along the edge (or the bottom) of the cell element 425, the insulator may extend all the way along the edge of the cell element 425 from the top of the cell element 425 to the bottom of the cell element 425, etc.).

According to another exemplary embodiment, the cell element 425 may have a thin insulator wrap (not shown) provided around the exterior of the cell element 425 in between the cell element 425 and the housing 426. According to this exemplary embodiment, the cell 424 may also include a thin insulator (e.g., ring, washer, etc.) (not shown) provided at the bottom of the cell element 425 between the cell element 425 and the bottom 430 of the housing 426. According to an exemplary embodiment, the thin insulator is part of the insulator wrap provided around the exterior of the cell element 425. According to another exemplary embodiment, the thin insulator is a separate component.

According to the exemplary embodiment shown in FIG. 12A, the electrochemical cell 424 further includes a current collector 432 that is electrically coupled (e.g., welded) to an end of the cell element 425 and to a bottom 430 of the housing 426 (e.g., to a center portion 444 of the vent 452 as shown in FIG. 12A). The current collector 432 is thinner than the current collector 132 shown in FIG. 10. Such a configuration may be used in particular in configurations where the cell element does not need to move in order to deploy the vent (e.g., the vent is pressure activated). Because the current collector 432 (and the insulator 434) is thin, more space within the housing 426 can be used for the cell element 425, allowing the cell 424 to have a higher power density.

Referring now to FIGS. 12B-12J, various configurations of vents for an electrochemical cell are shown according to a number of exemplary embodiments. The features of the cells (with the exception of the vents) shown FIGS. 12B-12J are similar to the features as described above with respect to FIG. 12A (with similar features as shown in FIG. 12A labeled with reference numbers in the 500 series for FIG. 12B, 600 series for FIG. 12C, 700 series for FIG. 12D, 800 series for FIG. 12E, 900 series for FIG. 12F, 1000 series for FIG. 12G, 1100 series for FIG. 12H, 1200 series for FIGS. 12I, and 1300 series for FIG. 12J).

Figure 12B:
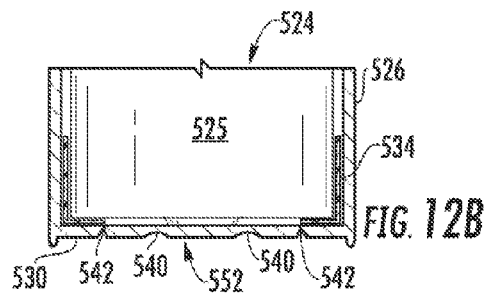
Figure 12C:
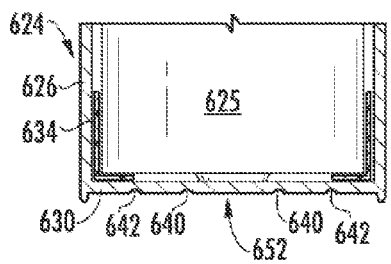
Figure 12D:
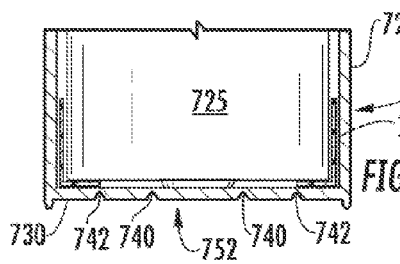
Figure 12E:
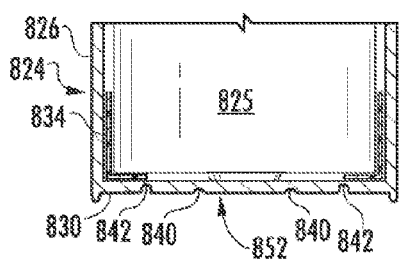
Figure 12F:
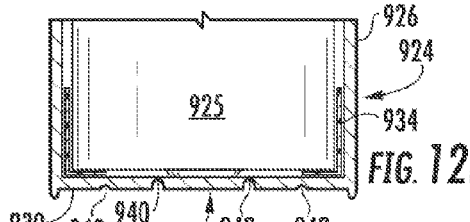
Figure 12G:
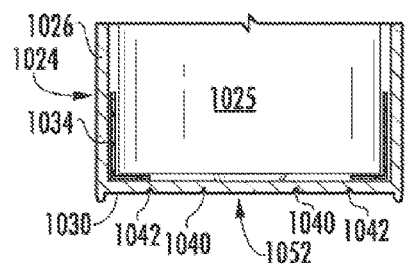
Figure 12H:
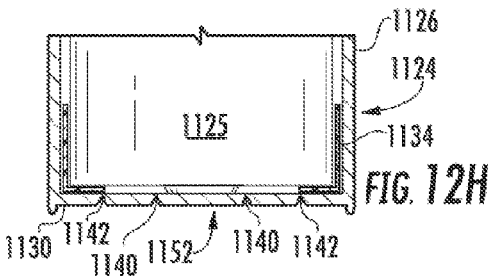
Figure 12I:
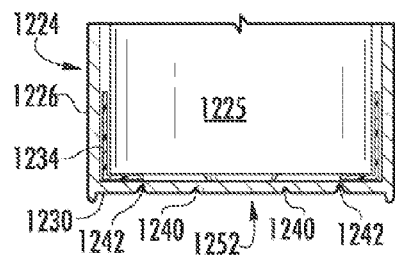
Figure 12J:
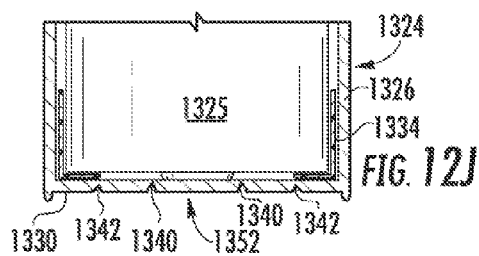

As shown in FIGS. 12B-12J, the inner and outer fracture grooves may have various shapes, sizes, and/or configurations. For example, the inner grooves may have a relatively wide profile (such as shown in FIG. 12B), a relatively tall profile (such as shown in FIG. 12F), or a pointed profile (such as shown in FIGS. 12G-12J). Additionally, for example, the outer grooves may have a short profile (such as shown in FIGS. 12C, 12G, and 12J), or a curved or rounded profile (such as shown in FIGS. 12C-12F). According to other exemplary embodiments, many other shapes, sizes, and/or configurations of fracture grooves are possible.

As shown in FIG. 12B, according to an exemplary embodiment, inner groove 540 has a rounded (e.g., semi-circular, arcuate, curved, etc.) configuration while outer groove 542 has a V-shaped configuration. As shown in FIG. 12C, according to an exemplary embodiment, both the inner groove 640 and the outer groove 642 have a relatively shallow rounded configuration. Alternatively, as shown in FIG. 12D, according to an exemplary embodiment, both the inner groove 740 and the outer groove 742 have a relatively large (e.g., deep) rounded configuration.

As shown in FIG. 12E, according to an exemplary embodiment, inner groove 840 has a relatively shallow circular or rounded configuration while outer groove 842 has a relatively large (e.g., deep) rounded configuration. In FIG. 12F, inner groove 940 has a relatively large (e.g., deep) rounded configuration while outer groove 942 has a relatively shallow rounded configuration.

According to another exemplary embodiment, as shown in FIG. 12G, both the inner groove 1040 and the outer groove 1042 have a relatively shallow V-shaped configuration. Alternatively, as shown in FIG. 12H, both the inner groove 1140 and the outer groove 1142 have a relatively large (e.g., deep) V-shaped configuration.

As shown in FIG. 12I, according to an exemplary embodiment, inner groove 1240 has a relatively shallow V-shaped configuration while outer groove 1242 has a relatively large (e.g., deep) V-shaped configuration. Alternatively, as shown in FIG. 12J, inner groove 1340 has a relatively large (e.g., deep) V-shaped configuration while outer groove 1342 has a relatively shallow V-shaped configuration.

Figure 13:
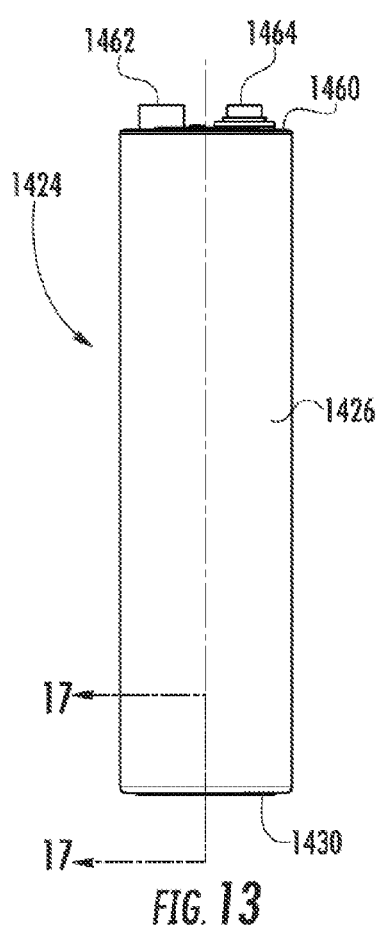
FIG. 13 is a side view of an electrochemical cell according to another exemplary embodiment.
Figure 14:
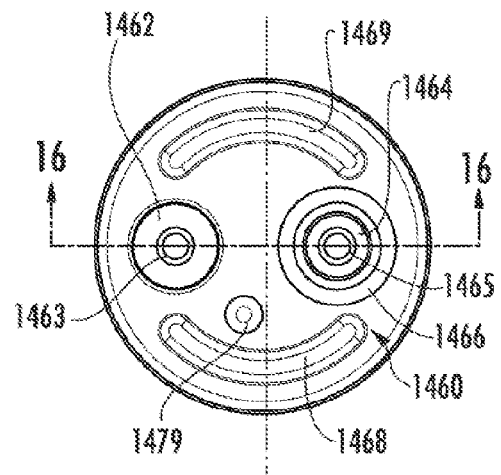
FIG. 14 is a top view of the electrochemical cell of FIG. 13 according to an exemplary embodiment.

Referring now to FIGS. 13-21, an electrochemical cell 1424 is shown according to another exemplary embodiment. As shown in FIG. 13, the electrochemical cell 1424 includes a can or housing 1426, a bottom portion 1430 located at a first end of the housing 1426 and a cover 1460 located at a second end of the housing 1426. The electrochemical 1424 also includes a first terminal (e.g., positive terminal 1462) and a second terminal (e.g., negative terminal 1464) coupled to the cover 1460 of the electrochemical cell 1424. As shown in FIG. 14, each terminal 1462, 1464 includes a threaded hole 1463, 1465 that is configured to receive a fastener to secure a buss bar thereto.

Also shown in FIG. 14, according to an exemplary embodiment, ridges or projections 1468, 1469 are configured to add strength and/or rigidity to the cover 1460 for when the cover 1460 is coupled (e.g. welded) to the housing 1426. The ridges 1468, 1469 may be curved or rounded as shown in FIG. 14 or may be otherwise configured (e.g., straight, squared, etc.). The cover 1460 also includes a fill hole and plug 1479 configured to allow electrolyte to be provided inside the housing 1426. The fill hole and plug 1479 may be located in a spot other than that is shown in FIG. 14 (such as, e.g., on the housing 1426, on the bottom portion 1430, etc.).

Figure 15:
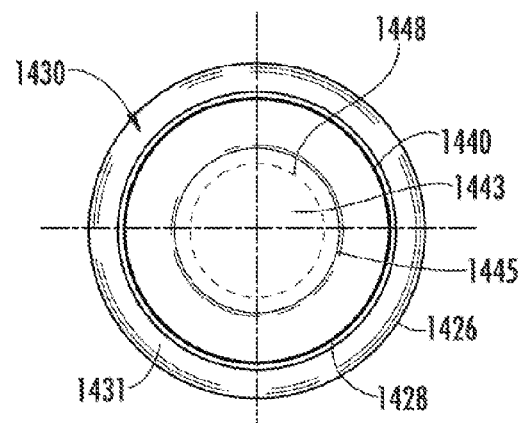
FIG. 15 is a bottom view of the electrochemical cell of FIG. 13 according to an exemplary embodiment.
Figure 15A:
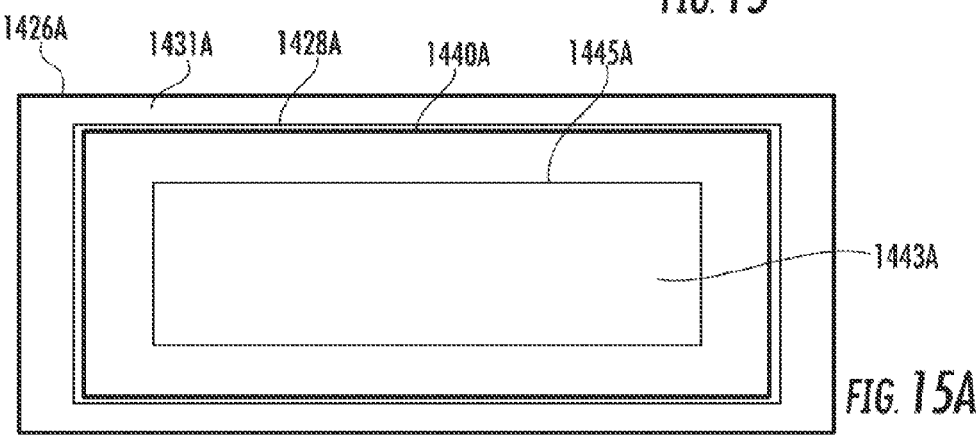
FIG. 15A is a bottom view of an electrochemical cell having features similar to the electrochemical cell of FIGS. 13-15 according to another exemplary embodiment.

FIG. 15 shows a bottom view of the electrochemical cell 1424 according to one exemplary embodiment. In this exemplary embodiment, the electrochemical cell 1424 is a cylindrical cell. According to other exemplary embodiments, the electrochemical cell 1424 may have a different shape. For example, as shown in FIG. 15A, the electrochemical cell 1424 may have a prismatic shape. According to still other exemplary embodiments, the electrochemical cell 1424 may have other shapes (e.g., hexagonal, oval, etc.). The features of FIGS. 15 and 15A (as will be described below in more detail) have similar functions; therefore the features shown in FIG. 15A have corresponding reference numbers to FIG. 15 but followed by a letter "A."

Figure 16:
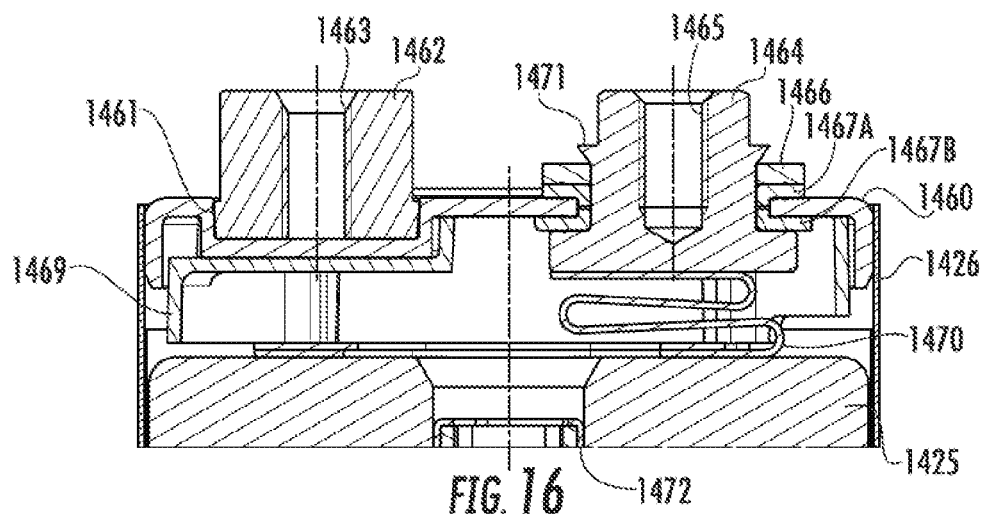
FIG. 16 is a cross-sectional view of a portion of the electrochemical cell of FIG. 13 taken along line 16-16 of FIG. 14 according to an exemplary embodiment.

As shown in FIG. 16, according to an exemplary embodiment, the cover 1460 is electrically and conductively coupled (e.g., welded) to the housing 1426. The positive terminal 1462 is electrically and connectively coupled to the cover 1460. According to one exemplary embodiment, the positive terminal 1462 is provided within a socket or recess 1461 provided in the cover 1460. According to one exemplary embodiment, the recess 1461 and the positive terminal 1462 are configured for an interference fit. According to another exemplary embodiment, the positive terminal 1462 is laser welded to the cover 1460 after the positive terminal 1462 has been provided within recess 1461 (with or without an interference fit between the positive terminal 1462 and the recess 1461).

According to the exemplary embodiment shown in FIG. 16, the negative terminal 1464 is provided with an aperture or hole of the cover 1460 and is electrically insulated from the cover 1460 by a insulating member (e.g., insulators 1467A and 1467B). According to one exemplary embodiment, as shown in FIG. 16, the insulators 1467A, 1467B are two separate components. However, according to another exemplary embodiment, the insulating member may be a single unitary member (i.e., one piece).

As shown in FIG. 16, the negative terminal 1464 is held in place within the aperture or hole of the cover 1460 by the geometry of the negative terminal 1464 on one side and a member or washer 1466 on the opposite side of the negative terminal 1464. As shown in FIG. 16, according to one exemplary embodiment, the negative terminal 1464 is deformed as shown by projection or deformation 1471, which holds the negative terminal 1464, the insulator 1467A, 1467B, and the washer 1466 in place.

According to an exemplary embodiment, the negative terminal 1464 is electrically and conductively coupled (e.g., welded) to a negative electrode of the electrochemical cell 1424 by a current collector (such as, e.g., negative current collector 1470 as shown in FIG. 16). The negative electrode, together with a positive electrode, form a cell element 1425 (e.g., a wound cell element) that is provided within the housing 1426 of the electrochemical cell 1424. A mandrel 1472 may be provided to wind the negative and positive electrodes around the mandrel 1472 to form the cell element 1425. According to another exemplary embodiment, the mandrel 1472 may not be required (e.g., such as on a prismatic cell, as shown in FIG. 15A).

As shown in FIG. 16, according to an exemplary embodiment, an insulating member such as insulator 1469 is provided below the cover 1460 (e.g., in an area generally underneath the positive terminal 1462) to insulate the cover 1460 from the negative terminal 1464, negative current collector 1470, and negative electrode of the cell element 1425. According to other exemplary embodiments, the insulator 1469 may have other shapes and/or sizes. According to another exemplary embodiment, the insulator 1469 is not included with the cell 1424.

According to one exemplary embodiment, the positive terminal 1462 comprises aluminum (e.g., aluminum alloy) or other suitable material. According to one exemplary embodiment, the negative terminal 1464 comprises copper (e.g., copper alloy) or other suitable material. Both the positive terminal 1462 and the negative terminal 1464 may be coated or plated with a nickel material, according to one exemplary embodiment. According to one exemplary embodiment, the insulators 1467A, 1467B and 1469 may be constructed from any suitable electrically insulating material. For example, the insulators may be constructed from a polyetherimide (e.g., such as ULTEM®, commercially available from SABIC Innovative Plastics of Riyadh, Saudi Arabia) or other suitable polymer material. The washer 1467 may be made from a suitable material, such as stainless steel. According to an exemplary embodiment, the housing 1426, the cover 1460, and the bottom 1430 may be constructed from aluminum (or aluminum alloy) or other suitable material.

Figure 17:
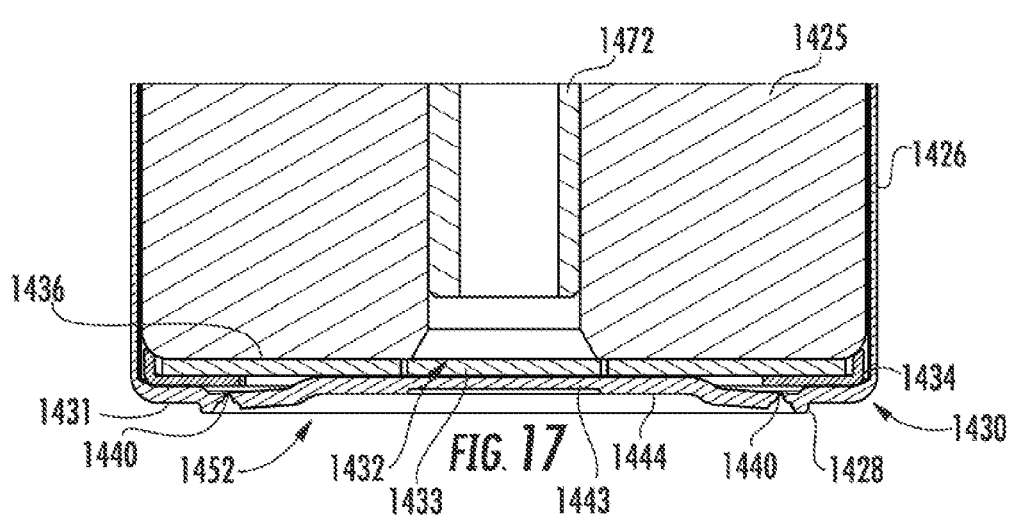
FIG. 17 is a cross-sectional view of a portion of the electrochemical cell of FIG. 13 taken along line 17-17 of FIG. 13 according to an exemplary embodiment.

Referring now to FIG. 17, a bottom portion of the cell 1424 is shown according to an exemplary embodiment. As shown in FIG. 17, the housing 1426 includes a vent 1452. The vent 1452 is configured to allow gases and/or effluent to exit the cell 1424 once the pressure inside the cell 1424 reaches a predetermined amount (e.g., during a rise in cell temperature). When the vent 1452 deploys (e.g., activates, opens, separates, etc.), the gases and/or effluent inside the cell 1424 exit the cell 1424 in order to lower the pressure inside the cell 24 (e.g., as represented by arrows 1449 shown in FIG. 17A). According to an exemplary embodiment, the vent 1452 acts as a safety device for the cell 1424 during a high pressure occurrence.

According to an exemplary embodiment, the vent 1452 is located in a bottom 1430 (or bottom portion) of the housing 1426. According to other exemplary embodiments, the vent 1452 may be located elsewhere (e.g., such as in the lid or cover of the cell). According to another exemplary embodiment, the vent 1452 may be located in a cover or bottom that is a separate component from the housing 1426 that in turn is coupled to the housing 1426 (e.g., by a welding operation).

According to the exemplary embodiment shown in FIG. 17, the housing 1426 and the bottom 1430 are formed as a single component (i.e., a single unitary member). According to an exemplary embodiment, the housing 1426 (with the bottom 1430) is formed by a deep drawing operation. However, according to other exemplary embodiments, the housing 1426 and the bottom 1430 may be separate components that are then coupled (e.g., welded) together.

According to the exemplary embodiment shown, the vent 1452 is coupled to the bottom 1430 by a weakened area shown as notch or groove 1440 (e.g., ring, trough, pressure point, fracture point, fracture ring, etc.). According to an exemplary embodiment, the vent 1452 is configured to break away (i.e., separate) from the bottom of the housing 1426 at the notch 1440 when the vent 1452 deploys (as will be described below in more detail with respect to FIG. 17A). According to an exemplary embodiment, the vent 1452 is formed by a stamping operation, a machining operation, or any other suitable operation.

The bottom 1430 also includes a generally flat area 1431 that is configured for mating with a seal provided as part of the battery module in which the electrochemical cell 1424 is provided. Such a seal may be a seal that is shown and described in International Patent Application No. PCT/US2009/053697, filed Aug. 13, 2009, the entire disclosure of which is incorporated herein by reference. Additionally, the generally flat area 1431 is configured to allow for an area of the electrochemical cell 1424 specifically for handling and transporting the cell 1424 without worry of prematurely deploying the vent 1452.

The bottom 1430 also includes a feature shown as a ridge or projection 1428 (e.g., protrusion, ring of material, etc.) provided adjacent an inner edge of the flat area 1431. According to an exemplary embodiment, the projection 1428 is configured to extend out and away from the bottom 1430 of the housing 1426 (e.g., the flat area 1431) such that the projection 1428 is the lowest point of the cell 1424. As such, the projection 1428 is configured to prevent any accidental or premature deployment of the vent 1452. For example, the projection 1428 provides for a clearance space between the vent 1452 and a surface that the cell 1424 is set upon. According to an exemplary embodiment, the clearance space is configured to prevent the vent 1452 from being accidentally bumped (and deployed) during handling and/or assembly of the cell 1424.

As shown in FIGS. 15 and 17, according to one exemplary embodiment, the projection 1428 is shown as a continuous ring (e.g., a raised circular ring). However, according to other exemplary embodiment, the projection 1428 may not be continuous (i.e., the projection 1428 may be discontinuous). For example, the projection 1428 may include multiple projections, such as, for example, multiple curved or arcuate projections. The multiple curved projections (or other type of projections) may or may not be equally spaced along the bottom 1430, according to various exemplary embodiments. According to other exemplary embodiments, the projections may be not be curved.

Figure 17A:
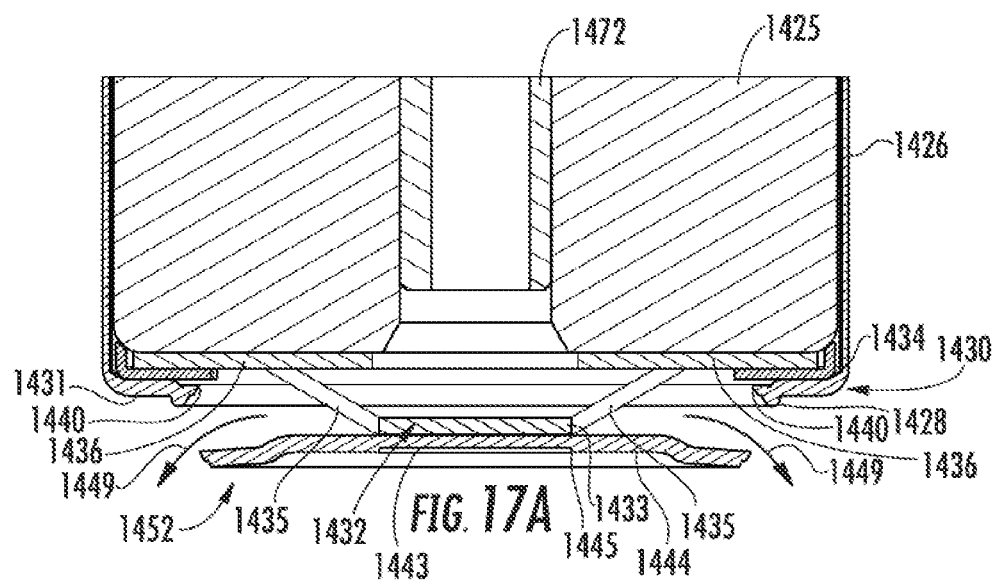
FIG. 17A is a cross-sectional view of the portion of the electrochemical cell of FIG. 17 showing a vent in a deployed state according to an exemplary embodiment.

As shown in FIGS. 17 and 17A, the electrochemical cell 1424 also includes a current collector (e.g., a positive current collector 1432). An example of such a current collector is shown and described in International Patent Application No. PCT/US2009/065365, filed on Nov. 20, 2009, the entire disclosure of which is hereby incorporated by reference. According to other exemplary embodiments, the current collector 1432 may be a negative current collector.

As shown in FIGS. 17 and 17A, a first side of the positive current collector 1432 is conductively coupled to a positive electrode of the cell element 1425 and a second side of the positive current collector 1432 is conductively coupled to a center portion 1444 of the vent 1452. Specifically, the positive current collector 1432 includes a center portion 1433 that is electrically and conductively coupled (e.g., welded) to the vent 1452. According to one exemplary embodiment, the center portion 1433 of the positive current collector 1432 is laser welded to the center portion 1444 of the vent 1452. For example, the center portion 1433 may be laser welded such as shown in FIG. 15 (i.e., a circular laser weld 1448). However, according to other exemplary embodiments, the positive current collector may be otherwise coupled to the vent 1452.

The positive current collector 1432 also includes flexible members or arms 1435 that are coupled at one end to the center portion 1433 of the positive current collector 1432 and at a second end to an outer portion 1436 of the positive current collector 1432. The outer portion 1436 of the positive current collector 1432 is electrically or conductively coupled (e.g., welded) to the positive electrode of the cell element 1425.

As shown in FIGS. 17 and 17A, the electrochemical cell 1424 also includes an insulating member shown as insulator 1434 provided between the positive current collector 1432 and the housing 1426 to electrically insulate the positive current collector 1432 from the housing 1426. According to an exemplary embodiment, the insulator 1434 extends in a first direction along a side of the cell element 1425 and in a second direction along a bottom of the cell element 1425. According to other exemplary embodiments, the insulator 1434 may be otherwise configured (e.g., the insulator may be two separate components, the insulator may extend only along the edge (or the bottom) of the cell element 1425, the insulator may extend all the way along the edge of the cell element 1425 from the top of the cell element 1425 to the bottom of the cell element 1425, etc.).

As shown in FIG. 17A, the vent 1452 is in a deployed state. The vent 1452 has broken or fractured from the bottom 1430 of the housing 1426 at the notch 1440 to allow gas and/or effluent (represented by arrows 1449) to exit the electrochemical cell 1424. The flexible arms 1435 allow the positive current collector 1432 to flex (i.e., moved downward) when the vent 1452 is deployed.

According to one exemplary embodiment, the cell element 1425 does not move during deployment of the vent 1452 (i.e., the cell element remains stationary and only the flexible arms 1435 and the vent 1452 move). According to such exemplary embodiments, flexible current collectors (such as current collector 1432) may be utilized. According to other exemplary embodiments, the cell element 1425 may move to help deploy the vent 1452 (e.g., by "pushing" or "punching" the current collector through the vent). According to such exemplary embodiments, non-flexible current collectors may be utilized.

When the vent 1452 detaches from the housing 1426, the path of current flow from the positive electrode to the housing 1426 (via the positive current collector 1432) is interrupted since the vent 1452 separates from the housing 1426 at the notch 1440. By having the vent 1452 separate from the bottom 1430 of the housing 1426, the vent 1452 acts as a current interrupt or current disconnect device. This is because the separation of the vent 1452 from the bottom 1430 of the housing 1426 disrupts the flow of current from the cell element 1425 (through the positive current collector 1432) to the housing 1426. In this way, the vent 1452 acts not only as an over-pressure safety device, but also as a current disconnect device.

As shown in FIGS. 18-21, the vent 1452 includes various features to help ensure that the vent 1452 evenly and completely detaches from the housing 1426 as the vent 1452 is deployed (e.g., to ensure current interruption). One such feature of the vent 1452 is the increased relative thickness of the vent 1452 as compared with the thickness of the housing wall (e.g., such as shown in FIG. 19). The increased relative thickness of the vent 1452 adds extra mass to the vent 1452 to help in deploying the vent 1452 after the vent 1452 has initially broken at one point of the notch 1440.

It is noted that the relatively thick vent 1452 may include a recessed area 1443 at the center of the vent 1452 (e.g. as shown in FIG. 18). The recessed area 1443 aides in proper laser welding of the current collector (for example, the positive current collector 1432) to the vent 1452. The recessed area 1443 transitions to the regular thickness of the vent 1452 at a step 1445 of the center portion 1444 of the vent 1452. According to one exemplary embodiment, the step 1445 has a generally square transition (e.g., corner) between the center portion 1444 and the step 1445 and a generally rounded transition between the recessed portion 1443 and the step 1445. However, according to other exemplary embodiment, the transition 1445 may have other shapes and/or sizes.

Another feature of the vent 1452 includes a first angled 1446 (e.g., angular portion, raised portion, elevated portion, etc.) and a second angled 1447 (e.g., angular portion, raised portion, elevated portion, etc.). The angled portions 1446 and 1447 are provided to increase the strength and rigidity of the vent 1452. According to one exemplary embodiment, the angle (e.g., angle "A" as shown in FIG. 20) of the first angled portion 1446 is between approximately 0 degrees and 10 degrees. According to another exemplary embodiment, the angle A is approximately 4 degrees. According to one exemplary embodiment the angle of the second angled portion 1447 (e.g., angle "B" as shown in FIG. 20) is between approximately 0 degrees and 40 degrees. According to another exemplary embodiment, the angle B is between approximately 30 degrees and 40 degrees. However according to other exemplary embodiments, angles A and B may be greater or smaller as required by the desired application. According to another exemplary embodiment, only one of the angled portions may be provided between the notch 1440 and the center portion 1444.

In addition to adding strength and rigidity to the vent 1452, the angled portions 1446, 1447 allow the vent 1452 to be at a height above the projection 1428. As noted earlier, this protects the vent 1452 from premature deployment. For example, if the electrochemical cell 1424 is handled too roughly placed on a surface, the lowest portion of the cell (i.e., the projection 1428) contacts the surface first, thus protecting the vent 1452.

Referring now to FIG. 21, a notch 1440 of the electrochemical cell 1424 is shown according to an exemplary embodiment. The notch 1440 includes a first step or diameter 1441 and a second step or diameter 1442. The first and second steps 1441, 1442 are connected by a ledge or surface 1453. The notch 1440 also includes a tip 1451 located at the top of the notch 1440. It is at this tip 1451 that the vent 1452 breaks away from the rest of the housing 1426. Due to the relative thinness of the notch 1440 at the tip 1451, the vent 1452 cleanly breaks away from the housing 1426. According to various exemplary embodiments, the tip 1451 of the notch 1440 may have any suitable shape (e.g., rounded shape, curved shape, upside down U-shape, upside down V-shape, etc.).

As can be seen in FIG. 21, the notch 1440 is provided relatively close to the projection 1428. However, according to other exemplary embodiments, the notch 1440 may be located further away from the projection 1428. According to an exemplary embodiment, the notch 1440 is formed from a 2-stage stamping operation that results in the first and second steps 1441, 1442. However, according to other exemplary embodiments, the notch 1440 may be otherwise formed and may or may not have the first and second steps 1441, 1442.

Also shown in FIG. 21 is a rounded surface 1456 that aides in the transition from the relatively thick bottom portion of the housing 1426 (i.e., the portion of the housing comprising the flat area 1431) to the relatively thin area of the notch 1440. However, according to other exemplary embodiments, the surface 1456 may be otherwise configured (e.g., straight, square cut, etc.).

Figure 21A:
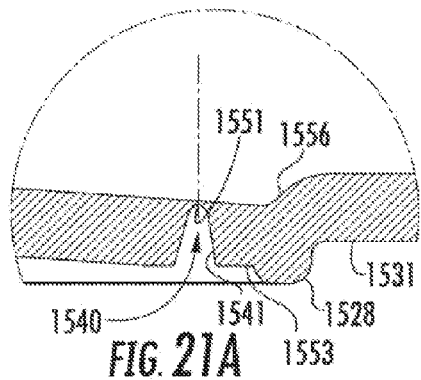
FIGS. 21-21F are detail views of a portion of a vent similar to that shown in FIG. 18 according to various exemplary embodiments.
Figure 21B:
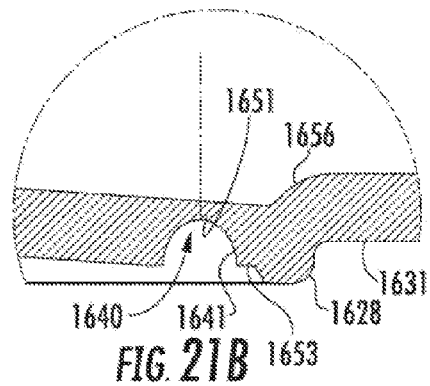
Figure 21C:
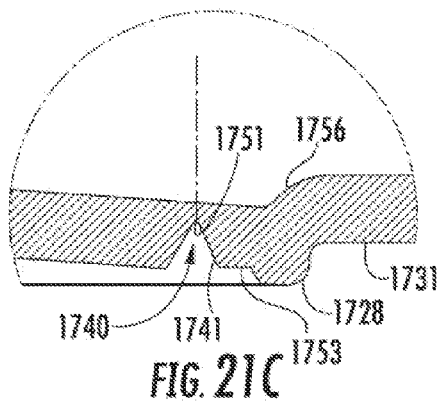
Figure 21D:
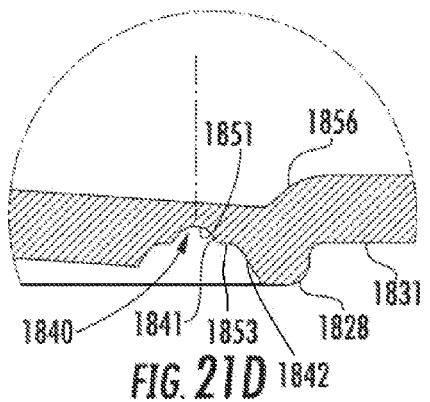
Figure 21E:
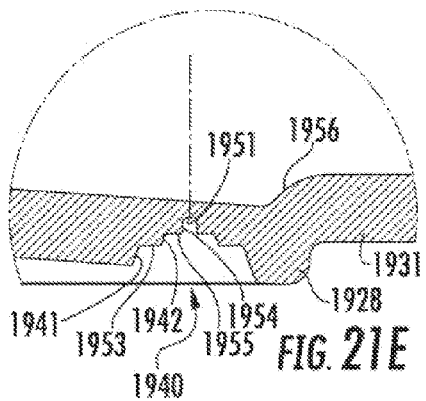
Figure 21F:
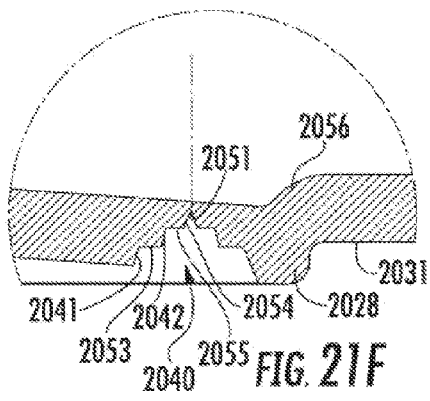

Referring now to FIGS. 21-21F, a notch is shown according to various exemplary embodiments. The components of each of the notches of FIGS. 21A-21F are represented by reference numbers that increase sequentially (with similar features as shown in FIG. 21 labeled with corresponding reference numbers in the 1500 series for FIG. 21A, 1600 series for FIG. 21B, 1700 series for FIG. 21C, 1800 series for FIG. 21D, 1900 series for FIG. 21E, and 2000 series for FIG. 21F).

As shown in FIG. 21A, the notch 1540 includes only a single step 1541. Notch 1540 is a relatively narrow opening and has a rounded tip 1551. In contrast, the notch 1640 as shown in FIG. 21B includes a relatively wide opening and rounded tip 1651. Alternatively, as shown in FIG. 21C, a pointed tip 1751 is shown. FIG. 21D shows a notch 1840 having a first step 1841 and second step 1842 with fairly rounded transitions between the steps 1841 and 1842.

According to another exemplary embodiment as shown in FIG. 21E, notch 1940 includes three steps with a rounded tip 1951. Alternatively, FIG. 21F shows a notch 2040 having three steps 2041, 2042, 2054 and a pointed tip 2051. According to other exemplary embodiments, the steps of FIGS. 21E-21F may be more rounded and/or have smoother transitions between the steps. According to other exemplary embodiments, the notches may have a greater or lesser number of steps and/or transitions.

The notches shown in FIGS. 21-21F may be formed from a machining operation (e.g., a mill or a lathe) or a stamping operation (e.g., progressive stamping). Because the geometry of the notch is located on the external side of the housing, the notch can be more efficiently created. For example, the tooling tolerance is only affected by one side of the tool, allowing for a more consistent notch, resulting in a more consistent and repeatable opening of the vent. The depth, shape, and size of the notch may be easily modified simply by changing the tooling. Additionally, having the notch located on the exterior side of the housing allows the notch to be much more easily cleaned and inspected prior to assembly within a battery module. For example, the notch may be inspected by a laser (e.g., to measure the size of the notch) from the outside of the cell.

Figure 22:
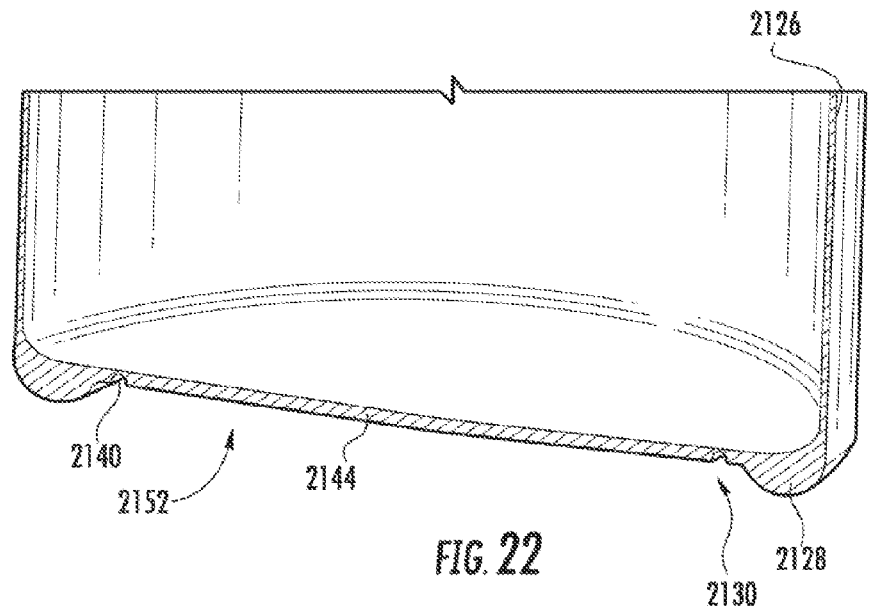
FIG. 22 is a cross-sectional view of a portion of a housing having a vent for an electrochemical cell according to another exemplary embodiment.

Referring now to FIG. 22, a cell housing 2126 having a vent 2152 for an electrochemical cell (e.g., cell 24) is shown according to another exemplary embodiment. As shown in FIG. 22, the vent 2152 is provided in a bottom portion 2130 of the housing 2126. According to other exemplary embodiments, the vent 2152 may be provided elsewhere (e.g., such as in the lid or cover of the cell). According to another exemplary embodiment, the vent 2152 may be located in a cover or bottom that is a separate component from the housing 2126 that in turn is coupled to the housing 2126 (e.g., by a welding operation).

As shown in FIG. 22, the vent 2152 includes a center portion 2144 that is coupled to the housing 2126 at a weakened area. For example, the vent 2152 includes at least one annular or circular fracture ring or groove 2140 (e.g., notch, cut, indentation, dimple, channel, trough, pressure point, fracture point, fracture ring, etc.) located near the outer circumference of the bottom 2130. According to an exemplary embodiment, the annular or circular fracture groove 2140 has a rounded bottom and is configured to break away (i.e., separate) from the bottom of the housing 2126 when the vent 2152 deploys. According to other exemplary embodiments, the bottom of the fracture groove 2140 may have another shape (e.g., curved shape, upside down U-shape, upside down V-shape etc.).

According to an exemplary embodiment, the bottom of the housing 2126 may include a ridge, projection, or ring of material 2128 to prevent fracture of the vent 2152 during handling and/or assembly of the cell. The projection 2128 provides for a clearance space between the vent 2152 and a surface that the cell is set upon. According to an exemplary embodiment, the clearance space is configured to prevent the vent 2152 from being accidentally bumped (and deployed) during handling and/or assembly of the cell.

According to an exemplary embodiment, the vent 2152 is formed by tooling located external the housing. The tooling tolerance is only affected by one side of the tool, allowing for a more consistent groove 2140, resulting in a more consistent and repeatable opening of the vent 2152. The depth, shape, and size of the groove 2140 may be easily modified simply by changing the tooling. Additionally, the vent 2152 is easy to clean and inspect since the vent 2152 (and groove 2140) is located on an external side of the housing 2126. For example, the groove 2140 may be inspected by a laser (e.g., to measure the size of the groove 2140) from the outside of the cell.

Figure 23:
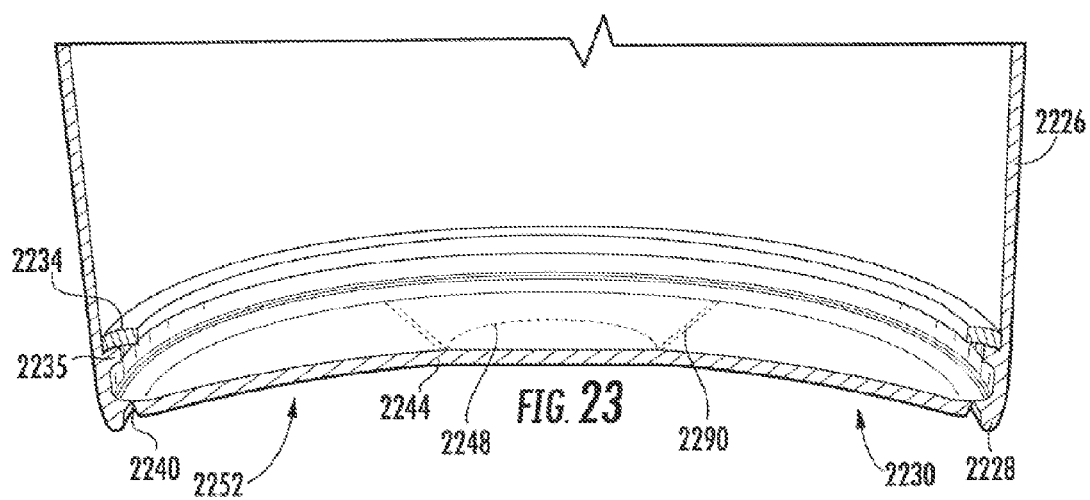
FIG. 23 is a cross-sectional view of a portion of a housing having a vent for an electrochemical cell according to another exemplary embodiment.

Referring now to FIG. 23, a cell housing 2226 having a vent 2252 for an electrochemical cell (e.g., cell 24) is shown according to another exemplary embodiment. As shown in FIG. 23, the vent 2252 is provided in a bottom portion 2230 of the housing 2226. According to other exemplary embodiments, the vent 2252 may be provided elsewhere (e.g., such as in the lid or cover of the cell). According to another exemplary embodiment, the vent 2252 may be located in a cover or bottom that is a separate component from the housing 2226 that in turn is coupled to the housing 2226 (e.g., by a welding operation).

As shown in FIG. 23, the vent 2252 includes a center portion 2244 that is coupled to the housing 2226 at a weakened area. For example, the vent 2252 includes at least one annular or circular fracture ring or groove 2140 (e.g., notch, cut, indentation, dimple, channel, trough, pressure point, fracture point, fracture ring, etc.) located near the outer circumference of the bottom 2230. According to an exemplary embodiment, the fracture groove 2240 has an upside down V-shaped bottom and is configured to break away (i.e., separate) from the bottom of the housing 2226 when the vent 2252 deploys. According to other exemplary embodiments, the bottom of the fracture groove 2240 may have another shape (e.g., rounded shape, curved shape, upside down U-shape, etc.).

According to an exemplary embodiment, the bottom of the housing 2226 may include a ridge, projection, or ring of material 2228 to prevent fracture of the vent 2252 during handling and/or assembly of the cell. The projection 2228 provides for a clearance space between the vent 2252 and a surface that the cell is set upon. According to an exemplary embodiment, the clearance space is configured to prevent the vent 2252 from being accidentally bumped (and deployed) during handling and/or assembly of the cell.

According to the exemplary embodiment shown in FIG. 23, the vent 2252 has a slightly domed shape (e.g., similar to the bottom of a soda can). The slightly domed shape of the vent 2252 helps to add rigidity and/or strength to the vent 2252. Further, the slightly domed shape of the vent 2252 raises the height of the center portion 2244 in relation to the bottom of the housing 2226. In connection with the projection 2228, the slightly domed shape of the vent 2252 aids in preventing the vent 2252 from being accidentally bumped (and deployed) during handling and/or assembly of the cell.

According to an exemplary embodiment, the vent 2252 may include features or ribs (such as, e.g., radial ribs 2290 as shown in FIG. 23) to add rigidity and/or strength to the vent 2252. According to an exemplary embodiment, the ribs are located on the external surface of the center portion 2244 of the vent 2252. However, according to other exemplary embodiments, the ribs may be located elsewhere (e.g., on the inside surface of the center portion 2244 of the vent 2252). According to another exemplary embodiment, the ribs may have a different shape and/or size (e.g., circular ribs).

According to the exemplary embodiment shown in FIG. 23, the housing 2226 includes an internal ledge 2235 (e.g., bend, projection, ridge, etc) configured to restrict movement of a cell element (not shown) past the ledge 2235. According to an exemplary embodiment, the cell element rests directly on the ledge 2235. According to another exemplary embodiment, the cell element is positioned a pre-determined distance away from the top of the ledge 2235, and moves downward toward the ledge 2235 during deployment of the vent 2252. According to another exemplary embodiment, an insulator (e.g., a ring insulator or washer insulator 2234 as shown in FIG. 23) may be provided between the cell element and the ledge 2235.

According to an exemplary embodiment, a current collector (not shown) may be coupled to the vent 2252 (e.g., at laser weld 2248 shown in FIG. 23) and to an end of the cell element. According to one exemplary embodiment, the current collector is a flexible current collector. According to this exemplary embodiment, the cell element is positioned directly on the ledge 2235 (with the insulator 2234 provided in between). During deployment of the vent 2252 (e.g., during an over pressurization of the cell), the groove 2240 fractures (due to the high pressure inside the cell) and separates from the rest of the bottom 2230 of the housing 2226. In this embodiment, the cell element remains stationary and the current collector is allowed to move.

According to another exemplary embodiment, the current collector (not shown) is a non-flexible current collector. According to this exemplary embodiment, the cell element is positioned a pre-determined distance away from the top of the ledge 2235. During deployment of the vent 2252, the outer groove 2240 fractures and separates from the bottom 2230 of the housing 2226. In this scenario, the cell element may move downward towards the vent 2252 to aid in the fracture of the groove 2240. For example, the cell element may "push" or "punch" through the bottom 2230 of the housing 2226 (via the non-flexible current collector) to aid in deployment of the vent 2252. However, in this embodiment, the downward travel of the cell element is limited by the ledge 2235. Once the cell element reaches the ledge 2235 (again, with the insulator 2234 provided in between), the downward movement of the cell element is restrained.

According to an exemplary embodiment, the vent 2252 is configured to separate from the bottom 2230 of the housing when using either the flexible current collector or the non-flexible current collector. By having the vent 2252 separate from the bottom 2230 of the housing 2226, the vent 2252 acts as a current interrupt or current disconnect device. This is because the separation of the vent 2252 from the bottom 2230 of the housing 2226 disrupts the flow of current from the cell element through the current collector and to the housing 2226. In this way, the vent 2252 acts not only as an overpressure safety device, but also as a current disconnect device.

According to an exemplary embodiment, the vent 2252 is formed by tooling located external the housing. The tooling tolerance is only affected by one side of the tool, allowing for a more consistent groove 2240, resulting in a more consistent and repeatable opening of the vent 2252. The depth, shape, and size of the groove 2240 may be easily modified simply by changing the tooling. Additionally, the vent 2252 is easy to clean and inspect since the vent 2252 (and groove 2240) is located on an external side of the housing 2226. For example, the groove 2240 may be inspected by a laser (e.g., to measure the size of the groove 2240) from the outside of the cell.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vents, electrochemical cells, and battery modules or systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An electrochemical cell comprising: a housing having a first end and a second end; a vent defined by a peripheral vent groove located on an exterior surface of the first end and extending along an entire periphery of the first end, wherein the peripheral vent groove is configured to fracture in response to a given pressure within the housing so as to facilitate deployment of the vent outward and away from the exterior surface of the first end to allow the expulsion of gases from within the cell; and at least one projection extending outward from the first end of the housing, immediately adjacent and outside the peripheral vent groove along the periphery of the first end, wherein the at least one projection is configured to prevent accidental fracture of the peripheral vent groove.

2. The electrochemical cell of claim 1, wherein the at least one projection substantially surrounds the vent and extends outward from the first end beyond an outer surface of the vent.

3. The electrochemical cell of claim 1, wherein the peripheral vent groove defines a weakened area configured to facilitate deployment of the vent by releasing the vent outward from the first end when a predetermined pressure is reached within the housing.

4. The electrochemical cell of claim 3, wherein the peripheral vent groove is a continuous groove disposed about a periphery of the vent along the exterior surface of the first end.

5. The electrochemical cell of claim 4, wherein the peripheral vent groove comprises a first step and a second step.

6. The electrochemical cell of claim 4, wherein the peripheral vent groove comprises a pointed tip.

7. The electrochemical cell of claim 4, wherein the peripheral vent groove comprises a rounded tip.

8. The electrochemical cell of claim 1, wherein the at least one projection substantially surrounds the vent and the vent includes a first angular portion located between the projection and a center portion of the vent.

9. The electrochemical cell of claim 8, wherein the vent further comprises a second angular portion, the second angular portion located between the first angular portion and the center portion of the vent.

10. The electrochemical cell of claim 1, wherein the first end further comprises a generally flat area located between a wall of the housing and the at least one projection, wherein the flat area is configured for mating engagement with a seal.

11. The electrochemical cell of claim 1, wherein the vent has a thickness that is greater than the thickness of a wall of the housing.

12. The electrochemical cell of claim 11, wherein the vent comprises a center portion having a recess.

13. The electrochemical cell of claim 1, wherein the vent is a stamped vent.

14. The electrochemical cell of claim 1, wherein the housing further comprises a second end opposite the first end having at least one terminal extending therefrom.

15. An electrochemical cell comprising: a housing; a peripheral vent groove located on a first end of the housing and extending along an entire periphery of the first end, the peripheral vent groove configured to fracture in response to a given pressure within the housing so as to separate a vent from the first end of the housing to allow gases from within the cell to exit the cell, wherein the vent is located on an exterior surface of the first end of the housing and configured to be separated outward and away from the exterior surface of the first end; and at least one projection extending outward from the first end of the housing, immediately adjacent to and partially surrounding at least a portion of the peripheral vent groove, wherein the at least one projection is configured to prevent accidental fracture of the peripheral vent groove.

16. The electrochemical cell of claim 15, wherein the vent is coupled to the first end of the housing by the peripheral vent groove.

17. The electrochemical cell of claim 16, wherein the peripheral vent groove comprises a first step and a second step.

18. The electrochemical cell of claim 15, wherein the vent includes a first angular portion located between the projection and a center portion of the vent.

19. The electrochemical cell of claim 18, wherein the vent further comprises a second angular portion, the second angular portion located between the first angular portion and the center portion of the vent.

20. The electrochemical cell of claim 1, wherein the at least one projection is configured to prevent deployment of the vent before a predetermined pressure is reached within the housing.

21. The electrochemical cell of claim 1, wherein the vent is configured to deploy from the exterior surface of the first end of the housing but remain in contact with the cell via flexible arms coupled between the vent and an internal component of the electrochemical cell.

22. The electrochemical cell of claim 21, wherein the internal component of the electrochemical cell comprises a current collector.

23. The electrochemical cell of claim 1, wherein the peripheral vent groove is an annular peripheral vent groove extending annularly along the periphery of the first end.

* * * * *